(12) United States Patent
Yabu et al.

(10) Patent No.: US 6,978,635 B2
(45) Date of Patent: *Dec. 27, 2005

(54) ADSORPTION ELEMENT AND AIR CONDITIONING DEVICE

(75) Inventors: Tomohiro Yabu, Osaka (JP); Guannan Xi, Osaka (JP); Akira Kamino, Osaka (JP)

(73) Assignee: Daikin Industries Ltd., Osaka (JP)

( * ) Notice: Subject to any disclaimer, the term of this patent is extended or adjusted under 35 U.S.C. 154(b) by 108 days.

This patent is subject to a terminal disclaimer.

(21) Appl. No.: 10/476,658

(22) PCT Filed: Jul. 18, 2002

(86) PCT No.: PCT/JP02/07330

§ 371 (c)(1),
(2), (4) Date: Nov. 4, 2003

(87) PCT Pub. No.: WO03/008873

PCT Pub. Date: Jan. 30, 2003

(65) Prior Publication Data

US 2004/0134210 A1    Jul. 15, 2004

(30) Foreign Application Priority Data

Jul. 18, 2001  (JP) .............................. 2001-218336
Jan. 7, 2002   (JP) .............................. 2002-000260

(51) Int. Cl.⁷ .......................... F25D 23/00; F25D 17/06
(52) U.S. Cl. ...................... 62/271; 62/93; 62/94; 62/97
(58) Field of Search ................................. 62/271, 93–97

(56) References Cited

U.S. PATENT DOCUMENTS

| 5,020,335 | A | * | 6/1991 | Albers et al. ................. 62/271 |
| 5,826,434 | A | * | 10/1998 | Belding et al. ................. 62/90 |
| 6,415,859 | B1 | * | 7/2002 | Kametani et al. ........... 165/229 |
| 2004/0123615 | A1 | * | 7/2004 | Yabu et al. | |

FOREIGN PATENT DOCUMENTS

| JP | 39434/1980 | 3/1980 |
| JP | 132471/1981 | 10/1981 |
| JP | 46267/1982 | 3/1982 |
| JP | 7-233966 A | 9/1995 |
| JP | 10-205819 A | 8/1998 |
| JP | 2001-62242 A | 3/2001 |

* cited by examiner

Primary Examiner—Cheryl Tyler
Assistant Examiner—Filip Zec
(74) Attorney, Agent, or Firm—Birch, Stewart, Kolasch & Birch, LLP

(57) ABSTRACT

An adsorption element (81, 82) is formed by an alternating lamination of flat plate members (83) and corrugated plate members (84). Each flat plate member (83) is a given rectangle of $L_1/L_2=2$. In the adsorption element (81, 82), humidity adjusting side passageways (85) are opened on side surfaces of the adsorption element (81, 82) which are located on the longer-side side of the flat plate members (83). Additionally, cooling side passageways (86) are opened on side surfaces of the adsorption element (81, 82) which are located on the shorter-side side of the flat plate members (83).

13 Claims, 18 Drawing Sheets

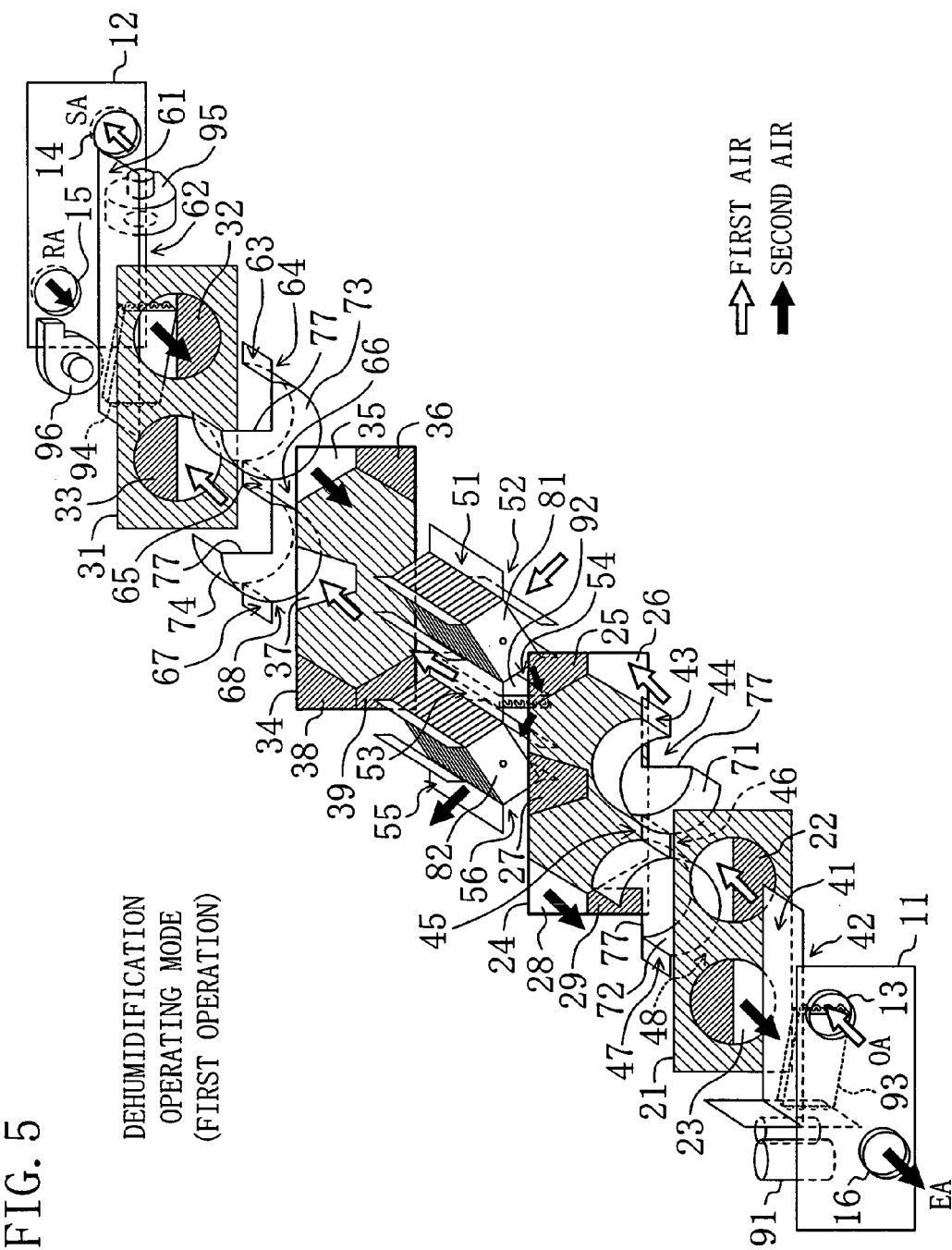

FIG. 10
(PRIOR ART)
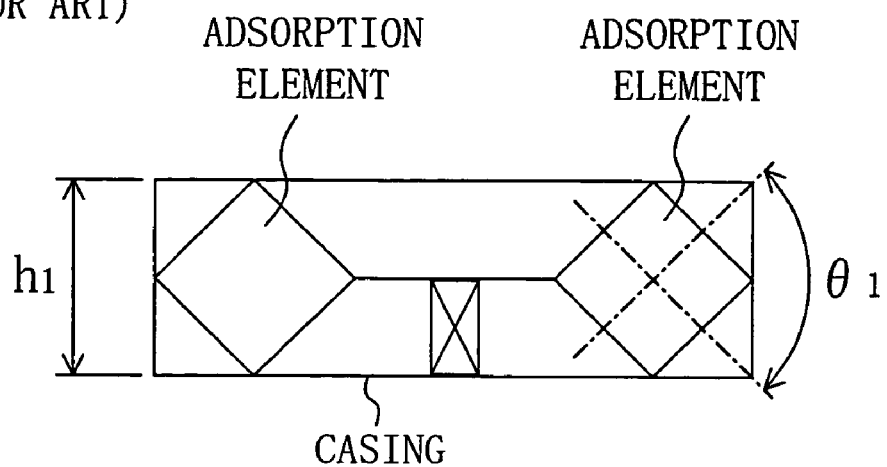
(EMBODIMENT 1)
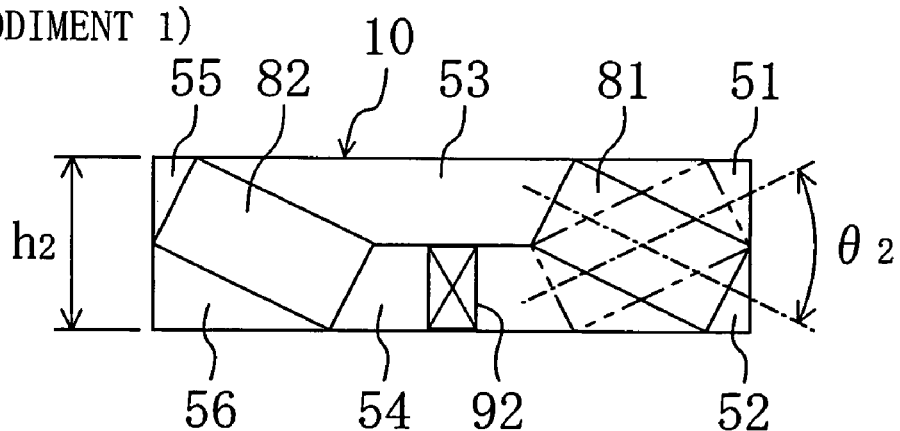

ADSORPTION ELEMENT AND AIR CONDITIONING DEVICE

TECHNICAL FIELD

The present invention relates to an adsorption element having an adsorbent for adsorption and desorption of water vapor in the air, and to an air conditioning apparatus, provided with such an adsorption element, for performing air humidity adjustment.

BACKGROUND ART

An adsorption element having an adsorbent, as disclosed in Japanese Patent Kokai Publication No. (2001)62242, has been known in the prior art. Adsorption-side and cooling-side air passageways are divisionally formed in the adsorption element. Additionally, an inner surface of the adsorption-side air passageway is coated with adsorbent.

When air is introduced into the adsorption-side air passageway of the adsorption element, the adsorbent adsorbs water vapor contained in the air. Such water vapor adsorption by the adsorbent produces heat of adsorption by which air flowing through the adsorption-side air passageway is heated. As a result, the temperature of the air in the adsorption-side air passageway increases, thereby causing the relative humidity of the air to decrease, and the amount of water vapor that the adsorbent adsorbs will be reduced finally. To cope with this, air for cooling is made to flow through an air passageway for cooling in the adsorption element so that the amount of air dehumidification is ensured by robbing heat of adsorption.

PROBLEMS TO BE SOLVED

In order to ensure that an adsorbent adsorbs water vapor, it is desirable that air is unfailingly brought into contact with the adsorbent in the adsorption-side air passageway of the adsorption element. On the other hand, it is desirable to increase the amount of heat which is transferred between the adsorption-side air and the cooling-side air by increasing the coefficient of overall heat transmission between the adsorption-side air and the cooling-side air in the cooling-side air passageway.

However, the shape of conventional adsorption elements is determined based on manufacturing problems or the like. In other words, a conventional adsorption element is shaped without taking into account the difference in function between the adsorption side and the cooling side. Stated another way, a typical conventional adsorption element is square column-shaped, having a square cross section, and its adsorption-side and cooling-side air passageways have the same opening area. Accordingly, it is impossible for such a conventional adsorption element to make full use of its ability of adsorption. This produces the problem that the adsorption element fails to ensure adsorption of a sufficient amount of water vapor according to its adsorption ability. Another problem is that, when trying to ensure the amount of adsorption, this may result in an increase in size of the adsorption element.

Bearing in mind these problems, the present invention was made. Accordingly, an object of the present invention is to improve the ability of adsorption of an adsorption element by optimizing the shape thereof, and to provide an air conditioning apparatus having a high-performance adsorption element.

DISCLOSURE OF INVENTION

The present invention provides a first problem solving means which is directed to an adsorption element comprising first passageways (85) where air flowing therethrough comes into contact with adsorbent and second passageways (86) through which air flows for taking heat of adsorption produced in the first passageways (85). In the adsorption element of the first problem solving means, the adsorption element is rectangular parallelepiped-shaped by lamination of rectangular plate-shaped partition members (83, 210) at predetermined intervals; the first passageways (85) and the second passageways (86) are formed alternately in the lamination direction of the partition members (83, 210); the first passageways (85) are opened on side surfaces of the adsorption element (81, 82) which are located on the longer-side side of the partition members (83, 210); and the second passageways (86) are opened on side surfaces of the adsorption element (81, 82) which are located on the shorter-side side of the partition members (83, 210).

The present invention provides a second problem solving means according to the first problem solving means in which each partition member (83, 210) having longer sides and shorter sides is formed such that the length of the longer sides is not more than four times the length of the shorter sides.

The present invention provides a third problem solving means which is directed to an adsorption element (81, 82) comprising a plurality of element parts (251, . . . ) in each of which are formed first passageways (85) where air flowing therethrough comes into contact with adsorbent and second passageways (86) through which air flows for taking heat of adsorption produced in the first passageways (85), wherein the plural element parts (251, . . . ) are combined such that first air flows through each first passageway (85) and second air flows through each second passageway (86). In the adsorption element (81, 82) of the third problem solving means, the plural element parts (251, . . . ) are arranged so that: the adsorption element (81, 82) is rectangular parallelepiped-shaped as a whole, and closed end surfaces (240) of the adsorption element (81, 82), on which neither the first passageways (85) nor the second passageways (86) are opened, are rectangle-shaped, and that the first passageways (85) are opened on side surfaces of the adsorption element (81, 82) which are located on the longer-side side of the closed end surfaces (240), and the second passageways (86) are opened on side surfaces of the adsorption element (81, 82) which are located on the shorter-side side of the closed end surfaces (240).

The present invention provides a fourth problem solving means according to the third problem solving means in which each closed end surface (240) of the adsorption element (81, 82) has longer and shorter sides and the length of the longer sides is not more than four times the length of the shorter sides.

The present invention provides a fifth problem solving means which is directed to an air conditioning apparatus comprising a plurality of adsorption elements (81, 82), wherein the air conditioning apparatus alternately repeatedly carries out a first operation in which air is dehumidified in the first adsorption element (81) simultaneously with adsorbent regeneration in the second adsorption element (82) and a second operation in which air is dehumidified in the second adsorption element (82) simultaneously with adsorbent regeneration in the first adsorption element (81), for performing either an operating mode during which air taken in is dehumidified and then supplied indoors or an operating mode during which air taken in is humidified and then supplied indoors. In the air conditioning apparatus of the fifth problem solving means, the adsorption element (81, 82) comprises first passageways (85) where air flowing therethrough comes into contact with adsorbent and second passageways (86) through which air flows for taking heat of adsorption produced in the first passageways (85); the adsorption element (81, 82) is rectangular parallelepiped-shaped by lamination of rectangular plate-shaped partition members (83, 210) at predetermined intervals; the first passageways (85) and the second passageways (86) are formed alternately in the lamination direction of the partition members (83, 210); and the first passageways (85) are opened on side surfaces of the adsorption element (81, 82) which are located on the longer-side side of the partition members (83, 210), and the second passageways (86) are opened on side surfaces of the adsorption element (81, 82) which are located on the shorter-side side of the partition members (83, 210).

The present invention provides a sixth problem solving means according to the fifth problem solving means, in which each partition member (83, 210) of the adsorption element (81, 82) having longer sides and shorter sides is formed such that the length of the longer sides is not more than four times the length of the shorter sides.

The present invention provides a seventh problem solving means which is directed to an air conditioning apparatus comprising a plurality of adsorption elements (81, 82), wherein the air conditioning apparatus alternately repeatedly carries out a first operation in which air is dehumidified in the first adsorption element (81) simultaneously with adsorbent regeneration in the second adsorption element (82) and a second operation in which air is dehumidified in the second adsorption element (82) simultaneously with adsorbent regeneration in the first adsorption element (81), for performing either an operating mode during which air taken in is dehumidified and then supplied indoors or an operating mode during which air taken in is humidified and then supplied indoors. In the air conditioning apparatus of the seventh problem solving means, each adsorption element (81, 82) comprises a plurality of element parts (251, . . . ) in each of which are formed first passageways (85) where air flowing therethrough comes into contact with adsorbent and second passageways (86) through which air flows for taking heat of adsorption produced in the first passageways (85), wherein the plural element parts (251, . . . ) are combined such that first air flows through each first passageway (85) and second air flows through each second passageway (86). In addition, the plural element parts (251, . . . ) are arranged so that the adsorption element (81, 82) is rectangular parallelepiped-shaped as a whole and closed end surfaces (240) of the adsorption element (81, 82), on which neither the first passageways (85) nor the second passageways (86) are opened, are rectangle-shaped, and that the first passageways (85) are opened on side surfaces of the adsorption element (81, 82) which are located on the longer-side side of the closed end surfaces (240) and, on the other hand, the second passageways (86) are opened on side surfaces of the adsorption element (81, 82) which are located on the shorter-side side of the closed end surfaces (240).

The present invention provides an eighth problem solving means according to the seventh problem solving means, in which each closed end surface (240) of the adsorption element (81, 82) has longer sides and shorter sides and the length of the longer sides is not more than four times the length of the shorter sides.

The present invention provides a ninth problem solving means which is directed to an air conditioning apparatus comprising an adsorption element (81, 82) and a heater (92) for heating air which is supplied to the adsorption element (81, 82) for adsorbent regeneration, in which the air conditioning apparatus carries out an operation in which an adsorbent of the adsorption element (81, 82) adsorbs water vapor contained in first air and an operation in which the adsorbent of the adsorption element (81, 82) is regenerated by second air heated by the heater (92), for the supplying of the dehumidified first air or the humidified second air into a room space. In the air conditioning apparatus of the ninth problem solving means, the adsorption element (81, 82) comprises first passageways (85) where air flowing therethrough comes into contact with adsorbent and second passageways (86) through which air flows for taking heat of adsorption produced in the first passageways (85); the adsorption element (81, 82) is rectangular parallelepiped-shaped by lamination of rectangular plate-shaped partition members (83, 210) at predetermined intervals; the first passageways (85) and the second passageways (86) are formed alternately in the lamination direction of the partition members (83, 210); and the first passageways (85) are opened on side surfaces of the adsorption element (81, 82) which are located on the longer-side side of the partition members (83, 210) and the second passageways (86) are opened on side surfaces of the adsorption element (81, 82) which are located on the shorter-side side of the partition members (83, 210).

The present invention provides a tenth problem solving means according to the ninth problem solving means in which each partition member (83, 210) of the adsorption element (81, 82), having longer sides and shorter sides, is formed such that the length of the longer sides is not more than four times the length of the shorter sides.

The present invention provides an eleventh problem solving means which is directed to an air conditioning apparatus comprising an adsorption element (81, 82) and a heater (92) for heating air which is supplied to the adsorption element (81, 82) for adsorbent regeneration, wherein the air conditioning apparatus carries out an operation in which an adsorbent of the adsorption element (81, 82) adsorbs water vapor contained in first air and an operation in which the adsorbent of the adsorption element (81, 82) is regenerated by second air heated by the heater (92), for the supplying of the dehumidified first air or the humidified second air into a room space. In the air conditioning apparatus of the eleventh problem solving means, the adsorption element (81, 82) comprises a plurality of element parts (251, . . . ) in each of which are formed first passageways (85) where air flowing therethrough comes into contact with adsorbent and second passageways (86) through which air flows for taking heat of adsorption produced in the first passageways (85), wherein the plural element parts (251, . . . ) are combined such that first air flows through each first passageway (85) and second air flows through each second passageway (86), and the plural element parts (251, . . . ) are arranged so that the adsorption element (81, 82) is rectangular parallelepiped-shaped as a whole and closed end surfaces (240) of the adsorption element (81, 82), on which neither the first passageways (85) nor the second passageways (86) are opened, are rectangle-shaped, and that the first passageways (85) are opened on side surfaces of the adsorption element (81, 82) which are located on the longer-side side of the closed end surfaces (240) and the second passageways (86)

are opened on side surfaces of the adsorption element (81, 82) which are located on the shorter-side side of the closed end surfaces (240).

The present invention provides a twelfth problem solving means according to the eleventh problem solving means, in which each closed end surface (240) of the adsorption element (81, 82) has longer sides and shorter sides and the length of the longer sides is not more than four times the length of the shorter sides.

Finally, the present invention provides a thirteenth problem solving means according to either the tenth problem solving means or the twelfth problem solving means, in which the temperature of the second air which is supplied to the adsorption element (81, 82) for adsorbent regeneration is not more than 100 degrees Centigrade.

Working Operation

In the first problem solving means, the adsorption element (81, 82) is formed by lamination of the plate-shaped partition members (83, 210). Each of the partition members (83, 210) that are stacked one upon the other is rectangle-shaped. Accordingly, the adsorption element (81, 82) is rectangular parallelepiped-shaped as a whole. Additionally, the partition members (83, 210) are laminated together, with a predetermined space left between adjoining partition members (83, 210). And, in the adsorption element (81, 82), the first passageways (85) and the second passageways (86) are alternately divisionally formed in the lamination direction of the partition members (83, 210).

In the adsorption element (81, 82) of the present problem solving means, the first passageways (85) are opened on side surfaces of the adsorption element (81, 82) which are located on the longer-side side of the partition members (83, 210), and the second passageways (86) are opened on side surfaces of the adsorption element (81, 82) which are located on the shorter-side side of the partition members (83, 210). In other words, of the four side surfaces of the adsorption element (81, 82) which are formed along the four sides of the partition members (83, 210), two greater side surfaces are where the first passageways (85) are opened and the remaining two smaller side surfaces are where the second passageways (86) are opened. Accordingly, the opening area of the first passageways (85) and the opening area of the second passageways (86) at the side surfaces of the adsorption element (81, 82) are as follows. In comparison with a conventional adsorption element made up of square plate-shaped partition members (83, 210), the opening area of the first passageways (85) coated with adsorbent is increased and, on the other hand, the opening area of the second passageways (86) for the flow of cooling air is decreased.

In the second problem solving means, each partition member (83, 210) having longer sides and shorter sides is formed such that the longer-side length is not more than four times the shorter-side length. Accordingly, in the adsorption element (81, 82), the area of side surfaces of the adsorption element (81, 82) which are located on the longer-side side of the partition members (83, 210) is not more than four times the area of side surfaces of the adsorption element (81, 82) which are located on the shorter-side side of the partition members (83, 210). Additionally, the opening area of the first passageways (85) is not more than four times the opening area of the second passageways (86). However, in any case, the opening area of the second passageways (86) does not exceed the opening area of the first passageways (85).

In the third problem solving means, a single adsorption element (81, 82) is formed by a plurality of element parts (251, . . . ). Formed in each element part (251, . . . ) are first and second passageways (85) and (86). In the adsorption element (81, 82) formed by a combination of the element parts (251, . . . ), first air flows through the first passageways (85) of each element part (251, . . . ) and, on the other hand, second air flows through the second passageways (86) of each element part (251, . . . ).

In the present problem solving means, the entire shape of the adsorption element (81, 82) made up of the element parts (251, . . . ) is rectangular parallelepiped-shaped. In the rectangular parallelepiped-shaped adsorption element (81, 82), each closed end surface (240) of the adsorption element (81, 82) made up of end surfaces of the element parts (251, . . . ) is rectangle-shaped. Additionally, in the adsorption element (81, 82), the first passageways (85) are opened on side surfaces of the adsorption element (81, 82) which are located on the longer-side side of the closed end surfaces (240) and, on the other hand, the second passageways (86) are opened on side surfaces of the adsorption element (81, 82) which are located on the shorter-side side of the closed end surfaces (240). In other words, in the adsorption element (81, 82) of the present problem solving means, the plural element parts (251, . . . ) are arranged in such orientation that the entire adsorption element (81, 82) is placed in the foregoing state.

As described above, in the adsorption element (81, 82) according to the present problem solving means, the first passageways (85) are opened on side surfaces of the adsorption element (81, 82) which are located on the longer-side side of the closed end surfaces (240) and, on the other hand, the second passageways (86) are opened on side surfaces of the adsorption element (81, 82) which are located on the shorter-side side of the closed end surfaces (240). In other word, of the four side surfaces of the adsorption element (81, 82) which are formed along the four sides of the closed end surfaces (240), two greater side surfaces are where the first passageways (85) are opened and the remaining two smaller side surfaces are where the second passageways (86) are opened.

In the fourth problem solving means, each closed end surface (240) of the adsorption element (81, 82) made up of a plurality of element parts (251, . . . ) is rectangle-shaped, having longer sides and shorter sides, wherein the length of the longer sides is not more than fourth times the length of the shorter sides. Accordingly, in the adsorption element (81, 82), the area of side surfaces of the adsorption element (81, 82) which are located on the longer-side side of the closed end surfaces (240) is not more than four times the area of side surfaces of the adsorption element (81, 82) which are located on the shorter-side side of the closed end surfaces (240). Additionally, in the entire adsorption element (81, 82), the opening area of the first passageways (85) is not more than four times the opening area of the second passageways (86). However, in any case, the opening area of the second passageways (86) does not exceed the opening area of the first passageways (85).

In each of the fifth, sixth, seventh, and eighth problem solving means, the air conditioning apparatus is provided with a plurality of adsorption elements (81, 82). The air conditioning apparatus performs a first operation and a second operation in alternation. The first operation comprises an operation in which water vapor is adsorbed by an adsorbent of the first adsorption element (81) for air dehumidification and an operation in which water vapor is desorbed from an adsorbent of the second adsorption element (82) for adsorbent regeneration and these operations are carried out at the same time. On the other hand, the second operation comprises an operation in which water vapor is adsorbed by the adsorbent of the second adsorption element (82) for air dehumidification and an operation in which water vapor is desorbed from the adsorbent of the first adsorption element (81) for adsorbent regeneration and these operations are carried out at the same time. In other words, in the air conditioning apparatus, air dehumidification by adsorbent and adsorbent regeneration are alternately repeatedly carried out in each adsorption element (81, 82).

The humidity adjusting apparatus of each of these problem solving means performs dehumidification or humidification of air that is supplied indoors. Stated another way, the humidity adjusting apparatus performs an operation of supplying air, dehumidified by water vapor removal therefrom in the adsorption element (81, 82), into the room or an operation of supplying air, humidified by receipt of water vapor desorbed from the adsorption element (81, 82), into the room. In addition, the humidity adjusting apparatus may be so constructed as to switchably perform an operation of supplying dehumidified air into the room and an operation of supplying humidified air into the room.

The air conditioning apparatus of each of the ninth, tenth, eleventh, and twelfth problem solving means is provided with an adsorption element (81, 82) and a heater (92). The air conditioning apparatus takes in first air and second air. When the first air is introduced into each first passageway (85) of the adsorption element (81, 82), moisture contained in the first air is adsorbed by the adsorbent. On the other hand, when the second air, after being heated by the heater (92), is introduced into each first passageway (85) of the adsorption element (81, 82), moisture is desorbed from the adsorbent. In other words, the adsorbent is regenerated and the moisture desorbed is given to the second air.

The humidity adjusting apparatus of each of these problem solving means performs dehumidification or humidification of air that is supplied indoors. Stated another way, such a humidity adjusting apparatus performs an operation of supplying first air, dehumidified by water vapor removal therefrom in the adsorption element (81, 82), into the room or an operation of supplying second air, humidified by receipt of water vapor desorbed from the adsorption element (81, 82), into the room. In addition, the humidity adjusting apparatus may be so constructed as to perform in switching manner an operation of supplying first air dehumidified into the room and an operation of supplying second air humidified into the room.

In the thirteenth problem solving means, the temperature of second air that is introduced into the adsorption element (81, 82) is not more than 100 degrees Centigrade. In other words, the temperature of second air heated by the heater (92) and then supplied to the adsorption element (81, 82) is not more than 100 degrees Centigrade.

Effects

In the adsorption element (81, 82) of the present invention, the partition members (83, 210) are rectangle-shaped and the closed end surfaces (240) are rectangle-shaped. Furthermore, in the adsorption element (81, 82) of the present invention, the first passageways (85) are opened on greater side surfaces of the adsorption element (81, 82) which are located on the longer-side side of the partition members (83, 210) or the closed end surfaces (240) and, on the other hand, the second passageways (86) are opened on smaller side surfaces of the adsorption element (81, 82) which are located on the shorter-side side of the partition members (83, 210) or the closed end surfaces (240).

Because of the above, in accordance with the present invention, the opening area of the second passageways (86) for the flow of cooling air is decreased and, as a result, the flow velocity of air in the cooling side passageways (86) is increased in comparison with the conventional case where the partition members (83, 210) and the closed end surfaces (240) are square-shaped, in addition to which the opening area of the first passageways (85) provided with adsorbent is increased and, as a result, the flow velocity of air in the first passageways (85) is decreased.

As the result of the above arrangement, the flow velocity of air in the second passageways (86) is increased while ensuring contact of air with the adsorbent in the first passageways (85), thereby making it possible to increase the quantity of heat transferring from air in the first passageways (85) to air in the second passageways (86). Accordingly, the present invention makes it possible to increase the quantity of heat of adsorption that air in the second passageways (86) absorbs while ensuring contact of air with the adsorbent in the first passageways (85), thereby enhancing the ability of adsorption of the adsorption element (81, 82).

BRIEF DESCRIPTION OF DRAWINGS

FIG. 5 is an exploded perspective view describing a first operation during the dehumidification operating mode of the air conditioning apparatus according to the first embodiment;

FIG. 10 is a diagram typically showing air conditioning apparatus arrangements for the description of effects of the first embodiment;

BEST MODE FOR CARRYING OUT INVENTION

Hereinafter, embodiments of the present invention will be described in detail with reference to the drawings. Incidentally, by the positional terms "upper", "lower", "left", "right", "front", "rear", "front side (near side)", and "rear side (far side)" as used herein are meant respectively "upper", "lower", "left", "right", "front", "rear", "front side (near side)", and "rear side (far side)" positions relative to the drawings referred to in the following description.

First Embodiment of Invention

An air conditioning apparatus according to a first embodiment of the present invention is so constructed as to operate switchably between a dehumidification operating mode in which outside air dehumidified and cooled is supplied indoors and a humidification operating mode in which outside air heated and humidified is supplied indoors. Furthermore, the air conditioning apparatus is provided with two adsorption elements (81, 82) and is so constructed as to perform a so-called batch system operation. Here, an arrangement of the air conditioning apparatus of the first embodiment will be described with reference to FIGS. 1–5.

Figure 1:
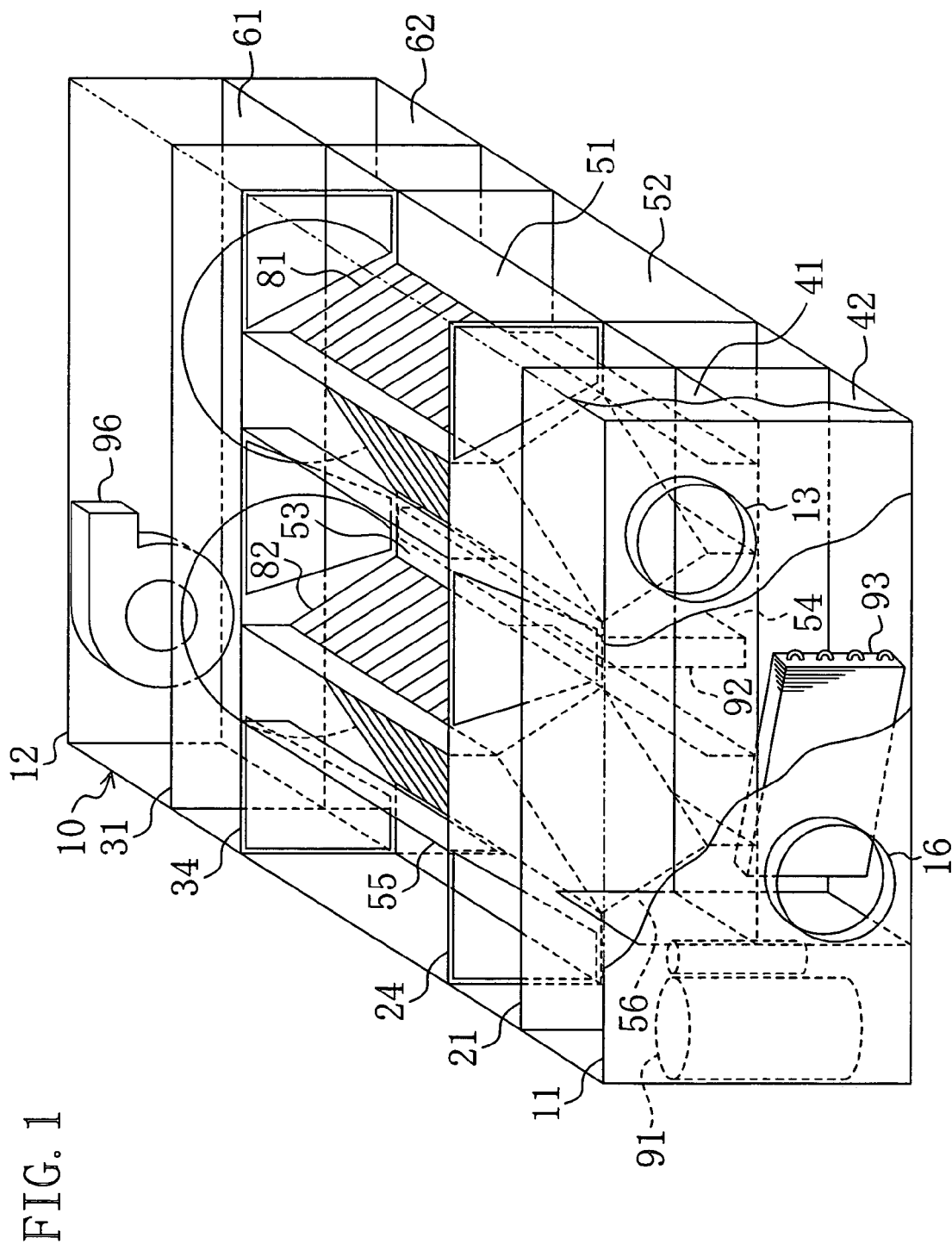
FIG. 1 is a schematic perspective view showing an arrangement of an air conditioning apparatus according to a first embodiment of the present invention.

As shown in FIGS. 1 and 5, the air conditioning apparatus has a somewhat flat, rectangular parallelepiped-shaped casing (10). The casing (10) houses, in addition to the two adsorption elements (81, 82), four rotary dampers (71, 72, 73, 74), and a single refrigerant circuit. Diagrammatic representation of the rotary dampers (71–74) is omitted in FIG. 1.

Figure 2:
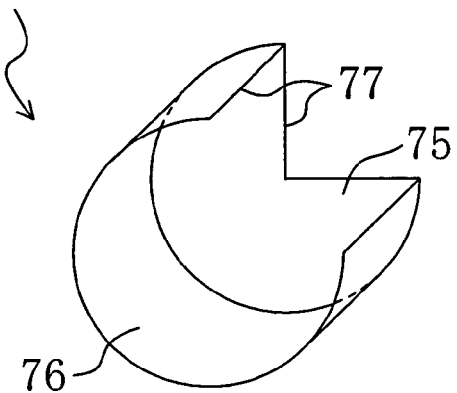
FIG. 2 is a schematic perspective view showing a rotary damper of the air conditioning apparatus according to the first embodiment.

As shown in FIG. 2, the rotary damper (71–74) comprises an end surface portion (75) shaped like a circular disc and a peripheral side portion (76) extending perpendicularly from an outer periphery of the end surface portion (75). The end surface portion (75) is notched, at its part, into a fan shape the central angle of which is 90 degrees. Additionally, a part of the peripheral side portion (76) corresponding to the notched part of the end surface portion (75) is also notched. The notched part of the end surface portion (75) and the notched part of the peripheral side portion (76) form a notched opening (77) of the rotary damper (71–74). The rotary damper (71–74) is formed rotatably around an axis passing through the center of the end surface portion (75).

Figure 3:
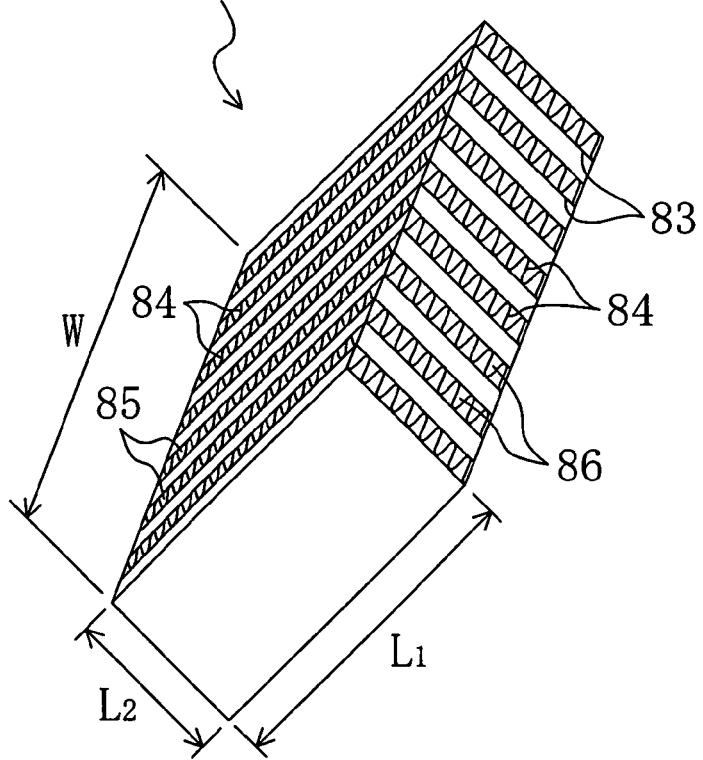
FIG. 3 is a schematic perspective view showing an adsorption element of the air conditioning apparatus according to the first embodiment.

As shown in FIG. 3, the adsorption element (81, 82) is formed by an alternating lamination of flat plate-shaped flat plate members (83) and wave-shaped corrugated plate members (84). The flat plate member (83) constitutes a rectangular plate-shaped partition member. Additionally, the flat plate member (83) is rectangle-shaped, having longer sides and shorter sides and the length of the longer sides ($L_1$) is twice the length of the shorter sides ($L_2$). In other words, in the flat plate member (83), $L_1/L_2=2$. The corrugated plate members (84) are laminated in such orientation that each corrugated plate member (84) is out of alignment in the ridgeline direction by an angle of 90 degrees from its neighboring corrugated plate member (84). And, the adsorption element (81, 82) is rectangular parallelepiped-shaped or square column-shaped. In other words, each of end surfaces of the adsorption element (81, 82) has the same rectangular shape as the flat plate member (83).

In the adsorption element (81, 82), humidity adjusting side passageways (85) which are first passageways and cooling side passageways (86) which are second passageways are divisionally formed in alternation in the lamination direction of the flat plate members (83) and the corrugated plate members (84), facing each other across the respective flat plate members (83). In the adsorption element (81, 82), the humidity adjusting side passageways (85) are opened on side surfaces on the longer-side side of the flat plate members (83) and, on the other hand, the cooling side passageways (86) are opened on side surfaces on the shorter-side side of the flat plate members (83). Both a surface of the flat plate member (83) that faces the humidity adjusting side passageway (85) and a surface of the corrugated plate member (84) disposed in the humidity adjusting side passageway (85) are coated with adsorbent capable of adsorbing water vapor. As the adsorbent, silica gel, zeolite, ion exchange resin, et cetera may be used.

The refrigerant circuit mentioned above is a closed circuit formed by piping connection of a compressor (91), a regenerative heat exchanger (92) which operates as a condenser, an expansion valve, a first cooling heat exchanger (93) which operates as an evaporator, and a second cooling heat exchanger (94) which operates as an evaporator. Diagrammatic representation of the entire arrangement of the refrigerant circuit and the expansion valve is omitted. The refrigerant circuit is so constructed as to perform a vapor compression refrigeration cycle by circulating a refrigerant charged therein. Furthermore, the first cooling heat exchanger (93) and the second cooling heat exchanger (94) are connected in parallel in the refrigerant circuit. And, the refrigerant circuit is so constructed as to operate switchably between an operation in which only the first cooling heat exchanger (93) serves as an evaporator with no introduction of refrigerant into the second cooling heat exchanger (94), and an operation in which only the second cooling heat exchanger (94) operates as an evaporator with no introduction of refrigerant into the first cooling heat exchanger (93).

Referring to FIGS. 1 and 5, the casing (10) is provided with an outdoor side panel (11) which is a nearest side panel, and an indoor side panel (12) which is a farthest side panel. An air supply side inlet (13) is formed in an upper-right corner of the outdoor side panel (11). An air discharge side outlet (16) is formed to the bottom left of the outdoor side panel (11). On the other hand, an air supply side outlet (14) is formed in a lower-right corner of the indoor side panel (12), and an air discharge side inlet (15) is formed in an upper-left corner of the indoor side panel (12).

Housed in the casing (10) are four partition plates (21, 24, 34, 31). These partition plates (21, 24, 34, 31) are standingly arranged in that order from near to far side, dividing an interior space of the casing (10) in a cross direction. In addition, each of these internal spaces of the casing (10) divided by the partition plates (21, 24, 34, 31) is further divided into an upper space and a lower space.

Divisionally formed between the outdoor side panel (11) and the first partition plate (21) are an upper-situated, first upper flow path (41) and a lower-situated, first lower flow path (42). The first upper flow path (41) communicates with an outdoor space through the air supply side inlet (13). The first lower flow path (42) communicates with an outdoor space through the air discharge side outlet (16). The first cooling heat exchanger (93) is disposed in the first lower flow path (42). In addition, the compressor (91) is disposed to the left of a space between the outdoor side panel (11) and the first partition panel (21).

The two rotary dampers (71, 72) are arranged side by side, in a lateral row, between the first partition plate (21) and the second partition plate (24). More specifically, the first rotary damper (71) is disposed to the right and the second rotary damper (72) is disposed to the left. The rotary dampers (71, 72) are disposed in such orientation that their respective end surface portions (75) face in the direction of the second partition plate (24). In addition, the rotary dampers (71, 72) are arranged such that they rotate while being in contact with both the first partition plate (21) and the second partition plate (24).

The space between the first partition plate (21) and the second partition plate (24) is divided into an upper space and a lower space. Each of the upper and lower spaces is further divided, by the first and second rotary dampers (71, 72), into three sections. Divisionally formed on the right side of the first rotary damper (71) are an upper-situated, second upper-right flow path (43) and a lower-situated, second lower-right flow path (44). Divisionally formed between the first rotary damper (71) and the second rotary damper (72) are an upper-situated, second upper-central flow path (45) and a lower-situated, second lower-central flow path (46). Further, divisionally formed on the left side of the second rotary damper (72) are an upper-situated, second upper-left flow path (47) and a lower-situated, second lower-left flow path (48).

The first partition plate (21) is provided with the following two openings (22) and (23). The first right side opening (22) which is opened on the right side is a circular opening formed at a position corresponding to the first rotary damper (71). The first left side opening (23) which is opened on the left side is a circular opening formed at a position corresponding to the second rotary damper (72). The first right side opening (22) and the first left side opening (23) are each provided with an opening/closing shutter. The operation of the opening/closing shutters enables the first right side opening (22) and the first left side opening (23) to switch between a state in which only an upper half portion of the opening area is placed in the open state, and a state in which only a lower half portion of the opening area is placed in the open state.

The two adsorption elements (81, 82) are arranged side by side, in a lateral row, between the second partition plate (24) and the third partition plate (34). More specifically, the first adsorption element (81) is disposed to the right and the second adsorption element (82) is disposed to the left. These adsorption elements (81, 82) are arranged in parallel in such orientation that their respective longitudinal directions correspond to the longitudinal direction of the casing (10).

As shown in FIG. 4, the adsorption elements (81, 82) are each disposed in such orientation that one of the diagonal lines of the flat plate member (83) constituting an end surface of the adsorption element (81, 82) extends approximately horizontally. In addition, the adsorption elements (81, 82) are arranged such that these horizontally extending end surface diagonal lines lie in the same straight line. Furthermore, each adsorption element (81, 82) is installed in such orientation that their respective side surfaces on the longer-side side thereof form slopes inclining in the same direction, and is formed rotatably on an axis passing through its end-surface center.

The space between the second partition plate (24) and the third partition plate (34) is divided into an upper space and a lower space. Each of the upper and lower spaces is further divided, by the first and second adsorption elements (81, 82), into three sections. In other words, divisionally formed on the right side of the first adsorption element (81) are an upper-situated, third upper-right flow path (51) and a lower-situated, third lower-right flow path (52). An upper-situated, third upper-central flow path (53) and a lower-situated, third lower-central flow path (54) are divisionally formed between the first adsorption element (81) and the second adsorption element (82). Divisionally formed on the left side of the second adsorption element (82) are an upper-situated, third upper-left flow path (55) and a lower-situated, third lower-left flow path (56). In addition, the third lower-central flow path (54) constitutes an air flow path for regeneration. The regenerative heat exchanger (92) of the refrigerant circuit, which constitutes a heater, is disposed in such orientation that it crosses the third lower-central flow path (54).

The second partition plate (24) is provided with the following five openings (25–29). The second upper-right opening (25) which is opened at an upper-right corner of the second partition plate (24) establishes communication between the second upper-right flow path (43) and the third upper-right flow path (51). The second lower-right opening (26) which is opened at a lower-right corner establishes communication between the second lower-right flow path (44) and the third lower-right flow path (52). The second central opening (27) which is opened at an upper center establishes communication between the second upper-central flow path (45) and the third upper-central flow path (53). The second upper-left opening (28) which is opened at an upper-left corner establishes communication between the second upper-left flow path (47) and the third upper-left flow path (55). Finally, the second lower-left opening (29) which is opened at a lower-left corner establishes communication between the second lower-left flow path (48) and the third lower-left flow path (56).

The second upper-right opening (25), the second lower-right opening (26), the second central opening (27), the second upper-left opening (28), and the second lower-left opening (29) are each provided with an opening/closing shutter. The operation of the opening/closing shutters enables the second upper-right opening (25), the second lower-right opening (26), the second central opening (27), the second upper-left opening (28), and the second lower-left opening (29) to switch between a communicating state and a shut-off state.

The two rotary dampers (73, 74) are arranged side by side, in a lateral row, between the third partition plate (34) and the fourth partition plate (31). More specifically, the third rotary damper (73) is disposed to the right and the fourth rotary damper (74) is disposed to the left. The rotational dampers (73, 74) are disposed in such orientation that their respective end surface portions (75) face in the direction of the third partition plate (34). In addition, the rotary dampers (73, 74) are arranged such that they rotate while being in contact with both the third partition plate (34) and the fourth partition plate (31).

The space between the third partition plate (34) and the fourth partition plate (31) is divided into an upper space and a lower space. Each of the upper and lower spaces is further divided, by the third and fourth rotary dampers (73, 74), into three sections. In other words, divisionally formed on the right side of the third rotary damper (73) are an upper-situated, fourth upper-right flow path (63) and a lower-situated, fourth lower-right flow path (64). An upper-situated, fourth upper-central flow path (65) and a lower-situated, fourth lower-central flow path (66) are divisionally formed between the third rotary damper (73) and the fourth rotary damper (74). Divisionally formed on the left side of the fourth rotary damper (74) are an upper-situated, fourth upper-left flow path (67) and a lower-situated, fourth lower-left flow path (68).

The third partition plate (34) is provided with the following five openings (35–39). The third upper-right opening (35) which is opened at an upper-right corner of the third partition plate (34) establishes communication between the third upper-right flow path (51) and the fourth upper-right flow path (63). The third lower-right opening (36) which is opened at a lower-right corner establishes communication between the third lower-right flow path (52) and the fourth lower-right flow path (64). The third central opening (37) which is opened at an upper center establishes communication between the third upper-central flow path (53) and the fourth upper-central flow path (65). The third upper-left opening (38) which is opened at an upper-left corner establishes communication between the third upper-left flow path (55) and the fourth upper-left flow path (67). Finally, the third lower-left opening (39) which is opened at a lower-left corner establishes communication between the third lower-left flow path (56) and the fourth lower-left flow path (68).

The third upper-right opening (35), the third lower-right opening (36), the third central opening (37), the third upper-left opening (38), and the third lower-left opening (39) are each provided with an opening/closing shutter. The operation of these opening/closing shutters enables the third upper-right opening (35), the third lower-right opening (36), the third central opening (37), the third upper-left opening (38), and the third lower-left opening (39) to switch between a communicating state and a shut-off state.

The fourth partition plate (31) is provided with the following two openings (32) and (33). The fourth right side opening (32) which is opened on the right side is a circular opening which is formed at a position corresponding to the third rotary damper (73). The fourth left side opening (33) which is opened on the left side is a circular opening which is formed at a position corresponding to the fourth rotary damper (74). The fourth right side opening (32) and the fourth left side opening (33) are each provided with an opening/closing shutter. The operation of these opening/closing shutters enables the fourth right side opening (32) and the fourth left side opening (33) to switch between a state in which only an upper half portion of the opening area is placed in the open state, and a state in which only a lower half portion of the opening area is placed in the open state.

Divisionally formed between the fourth partition plate (31) and the indoor side panel (12) are an upper-situated, fifth upper flow path (61) and a lower-situated, fifth lower flow path (62). The fifth upper flow path (61) is brought into communication with an indoor space by the air discharge side inlet (15). The fifth upper flow path (61) is provided with an air discharge fan (96). On the other hand, the fifth lower flow path (62) is brought into communication with an indoor space by the air supply side outlet (14). The fifth lower flow path (62) is provided with an air supply fan (95) and a second cooling heat exchanger (94).

Running Operation

Referring to FIGS. 4–8, the running operation of the above-described air conditioning apparatus will be described. FIG. 4 typically shows portions between the second partition plate (24) and the third partition plate (34) within the casing (10).

Dehumidification Operating Mode

Figure 6:
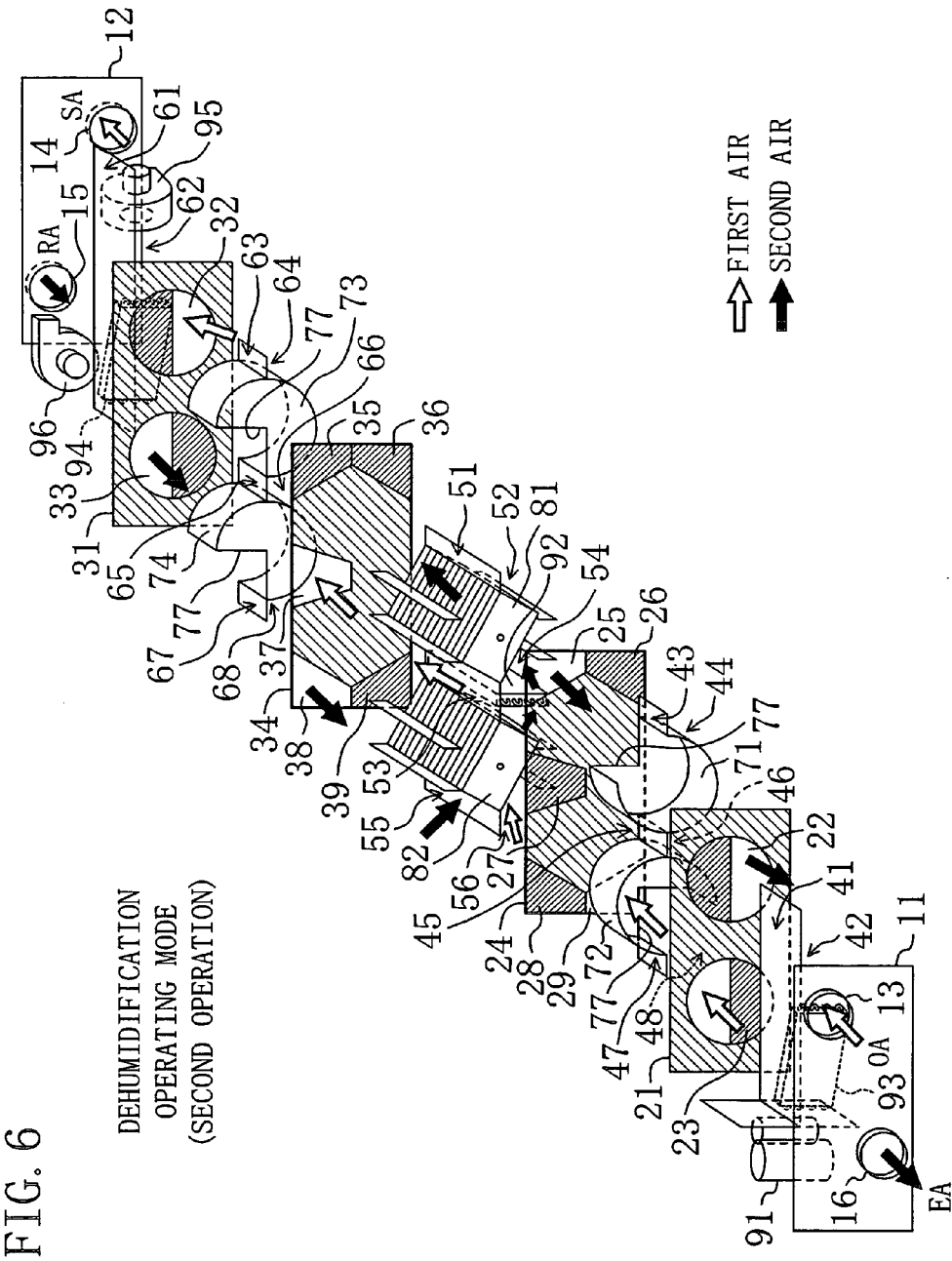
FIG. 6 is an exploded perspective view describing a second operation during the dehumidification operating mode of the air conditioning apparatus according to the first embodiment.

As shown in FIGS. 5 and 6, when the air supply fan (95) is activated in the dehumidification operating mode, outdoor air is taken into the inside of the casing (10) through the air supply side inlet (13). The outdoor air flows, as first air, into the first upper flow path (41). On the other hand, when the air discharge fan (96) is activated, indoor air is taken into the inside of the casing (10) through the air discharge side inlet (15). The indoor air flows, as second air, into the fifth upper flow path (61). Incidentally, since it is required to maintain a balance between the amount of air to be supplied indoors and the amount of air to be discharged from the room, the amount of outdoor air taken in as the first air is made equal to the amount of indoor air taken in as the second air in the above-described air conditioning apparatus.

Additionally, during the dehumidification operating mode, refrigeration cycles are carried out in the refrigerant circuit, in which the regenerative heat exchanger (92) operates as a condenser and the second cooling heat exchanger (94) operates as an evaporator. Stated another way, no refrigerant flows in the first cooling heat exchanger (93) in the dehumidification operating mode. And, the dehumidification operating mode of the air conditioning apparatus is performed by repeating first and second operations in alternation.

Referring to FIG. 5, the first operation of the dehumidification operating mode will be described. In the first operation, air is dehumidified by the first adsorption element (81) and, at the same time, the adsorbent of the second adsorption element (82) is regenerated.

In addition, in the first operation, the second upper-right opening (25), the second central opening (27), and the second lower-left opening (29) are placed in the closed state in the second partition plate (24). Furthermore, the third lower-right opening (36), the third upper-left opening (38), and the third lower-left opening (39) are placed in the closed state in the third partition plate (34).

An upper half portion of the first right side opening (22) is in the open state. The notched opening (77) of the first rotary damper (71) is oriented such that it is located lower right and opens to the second lower-right flow path (44). The second lower-right opening (26) of the second partition plate (24) is in the communicating state. In this state, the first air, which has flowed into the first upper flow path (41), passes through the first right side opening (22), the inside of the first rotary damper (71), the second lower-right flow path. (44), and the second lower-right opening (26) in that order, and then flows into the third lower-right flow path (52).

An upper half portion of the fourth right side opening (32) is in the open state. The notched opening (77) of the third rotary damper (73) is oriented such that it is located upper right and opens to the fourth upper-right flow path (63). The third upper-right opening (35) of the third partition plate (34) is in the communicating state. In this state, the second air, which has flowed into the fifth upper flow path (61), passes through the fourth right side opening (32), the inside of the third rotary damper (73), the fourth upper-right flow path (63), and the third upper-right opening (35) in that order, and then flows into the third upper-right flow path (51).

The humidity adjusting side passageway (85) of the first adsorption element (81) is in communication with the third lower-right flow path (52) as well as with the third upper-central flow path (53). The cooling side passageway (86) of the first adsorption element (81) is in communication with the third upper-right flow path (51) as well as with the third lower-central flow path (54). On the other hand, the humidity adjusting side passageway (85) of the second adsorption element (82) is in communication with the third lower-central flow path (54) as well as with the third upper-left flow path (55). The cooling side passageway (86) of the second adsorption element (82) is in communication with the third upper-central flow path (53) as well as with the third lower-left flow path (56).

Figure 4A:
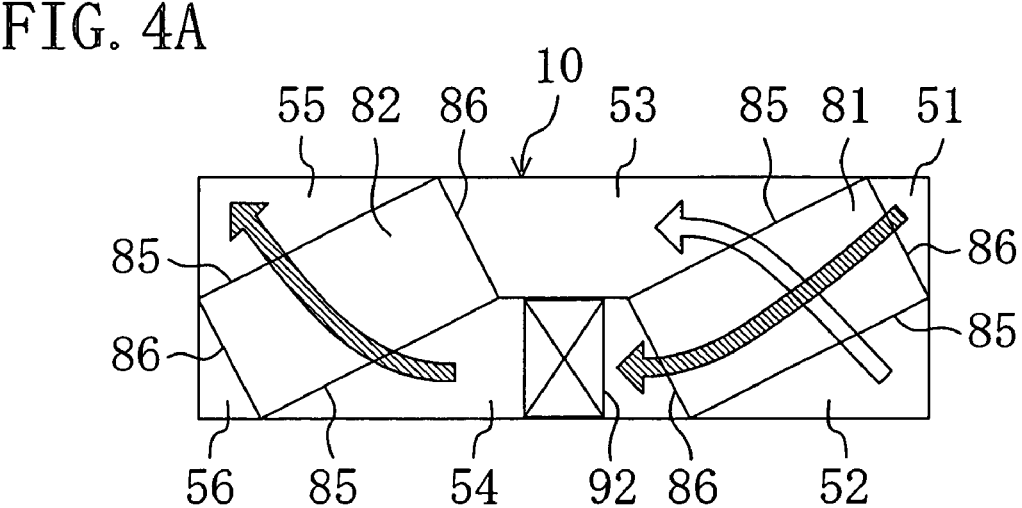
FIG. 4 is a diagram typically showing principal parts of the air conditioning apparatus according to the first embodiment.

As also shown in FIG. 4(a), in this state, the first air flows into the humidity adjusting side passageway (85) of the first adsorption element (81) from the third lower-right flow path (52). During the flow through the humidity adjusting side passageway (85), water vapor contained in the first air is adsorbed into the adsorbent. The first air dehumidified in the humidity adjusting side passageway (85) flows into the third upper-central flow path (53).

On the other hand, the second air flows into the cooling side passageway (86) of the first adsorption element (81) from the third upper-right flow path (51). During the flow through the cooling side passageway (86), the second air absorbs heat of adsorption produced when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated in the first adsorption element (81) and the regenerative heat exchanger (92) is introduced into the humidity adjusting side passageway (85) of the second adsorption element (82). In the humidity adjusting side passageway (85) the adsorbent is heated by the second air and, as a result, water vapor is desorbed from the adsorbent. In other words, the adsorbent is regenerated. Then, the water vapor desorbed from the adsorbent flows, together with the second air, into the third upper-left flow path (55).

The third central opening (37) of the third partition plate (34) is in the communicating state. The notched opening (77) of the fourth rotary damper (74) is oriented such that it is located upper right and opens to the fourth upper-central flow path (65). A lower half portion of the fourth left side opening (33) is in the open state. In this state, the first air dehumidified by the first adsorption element (81) passes through the third upper-central flow path (53), the third central opening (37), the fourth upper-central flow path (65), the inside of the fourth rotary damper (74), and the fourth left side opening (33) in that order, and then flows into the fifth lower flow path (62).

During the flow through the fifth lower flow path (62), the first air passes through the second cooling heat exchanger (94). In the second cooling heat exchanger (94), the first air is subjected to heat exchange with refrigerant and liberates heat to the refrigerant. And, the first air dehumidified and cooled passes through the air supply side outlet (14) and is supplied indoors.

The second upper-left opening (28) of the second partition plate (24) is in the communicating state. The notched opening (77) of the second rotary damper (72) is oriented such that it is located upper left and opens to the second upper-left flow path (47). A lower half portion of the first left side opening (23) is in the open state. In this state, the second air, which has flowed out of the second adsorption element (82), passes through the third upper-left flow path (55), the second upper-left opening (28), the second upper-left flow path (47), the inside of the second rotary damper (72), and the first left side opening (23) in that order, and then flows into the first lower flow path (42).

During the flow through the first lower flow path (42), the second air passes through the first cooling heat exchanger (93). At this time, no refrigerant is flowing through the first cooling heat exchanger (93). Accordingly, the second air just passes through the first cooling heat exchanger (93) and, therefore, neither absorbs nor liberates heat. Thereafter, the second air passes through the air discharge side outlet (16) and is discharged outdoors.

Referring to FIG. 6, the second operation of the dehumidification operating mode will be described. Contrary to the first operation, in the second operation, air is dehumidified in the second adsorption element (82) and, at the same time, the adsorbent of the first adsorption element (81) is regenerated.

In addition, in the second operation, the second lower-right opening (26), the second central opening (27), and the second upper-left opening (28) are closed in the second partition plate (24). Furthermore, the third upper-right opening (35), the third lower-right opening (36), and the third lower-left opening (39) are closed in the third partition plate (34).

An upper half portion of the first left side opening (23) is in the open state. The notched opening (77) of the second rotary damper (72) is oriented such that it is located lower left and opens to the second lower-left flow path (48). The second lower-left opening (29) of the second partition plate (24) is in the communicating state. In this communicating state, the first air, which has flowed into the first upper flow path (41), passes through the first left side opening (23), the inside of the second rotary damper (72), the second lower-left flow path (48), and the second lower-left opening (29) in that order, and then flows into the third lower-left flow path (56).

An upper half portion of the fourth left side opening (33) is in the open state. The notched opening (77) of the fourth rotary damper (74) is oriented such that it is located upper left and opens to the fourth upper-left flow path (67). The third upper-left opening (38) of the third partition plate (34) is in the communicating state. In this communicating state, the second air, which has flowed into the fifth upper flow path (61), passes through the fourth left side opening (33), the inside of the fourth rotary damper (74), the fourth upper-left flow path (67), and the third upper-left opening (38) in that order, and then flows into the third upper-left flow path (55).

At the time of switching from the first operation to the second operation, the first adsorption element (81) and the second adsorption element (82) are rotated clockwise relative to FIG. 4. And, the humidity adjusting side passageway (85) of the second adsorption element (82) is in communication with the third lower-left flow path (56) as well as with the third upper-central flow path (53). The cooling side passageway (86) of the second adsorption element (82) is in communication with the third upper-left flow path (55) as well as with the third lower-central flow path (54). In addition, the humidity adjusting side passageway (85) of the first adsorption element (81) is in communication with the third lower-central flow path (54) as well as with the third upper-right flow path (51). The cooling side passageway (86) of the first adsorption element (81) is in communication with the third upper-central flow path (53) as well as with the third lower-right flow path (52).

Figure 4B:
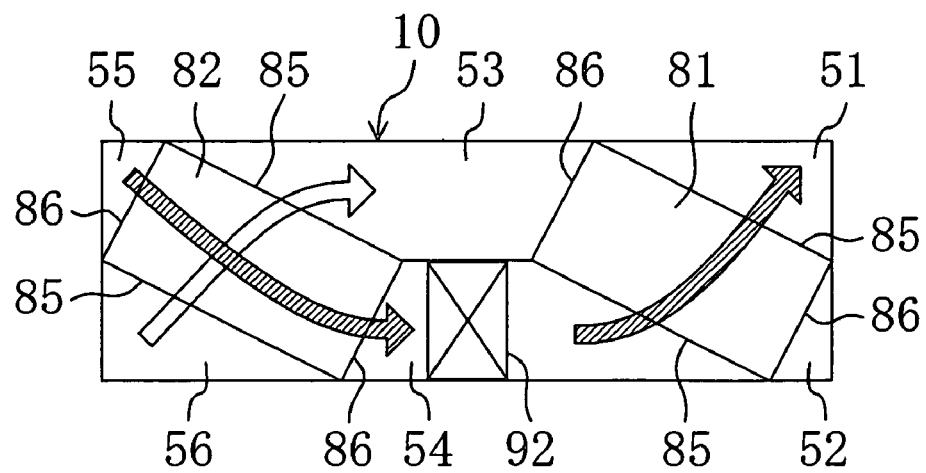

As also shown in FIG. 4(b), in this state, the first air flows into the humidity adjusting side passageway (85) of the second adsorption element (82) from the third lower-left flow path (56). During the flow through the humidity adjusting side passageway (85), water vapor contained in the first air is adsorbed into the adsorbent. The first air dehumidified in the humidity adjusting side passageway (85) flows into the third upper-central flow path (53).

Meanwhile, the second air flows into the cooling side passageway (86) of the second adsorption element (82) from the third upper-left flow path (55). During the flow through the cooling side passageway (86), the second air absorbs heat of adsorption produced when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated in the second adsorption element (82) and the regenerative heat exchanger (92) is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. The water vapor desorbed from the adsorbent flows, together with the second air, into the third upper-right flow path (51).

The third central opening (37) of the third partition plate (34) is in the communicating state. The notched opening (77) of the third rotary damper (73) is oriented such that it is located upper left and opens to the fourth upper-central flow path (65). A lower half portion of the fourth right side opening (32) is in the open state. In this state, the first air dehumidified by the second adsorption element (82) passes through the third upper-central flow path (53), the third central opening (37), the fourth upper-central flow path (65), the inside of the third rotary damper (73), and the fourth right side opening (32) in that order, and then flows into the fifth lower flow path (62).

During the flow through the fifth lower flow path (62), the first air passes through the second cooling heat exchanger (94). In the second cooling heat exchanger (94), the first air is subjected to heat exchange with refrigerant and liberates heat to the refrigerant. And the first air dehumidified and cooled passes through the air supply side outlet (14) and is supplied indoors.

The second upper-right opening (25) of the second partition plate (24) is in the communicating state. The notched opening (77) of the first rotary damper (71) is oriented such that it is located upper right and opens to the second upper-right flow path (43). A lower half portion of the first right side opening (22) is in the open state. In this state, the second air, which has flowed out of the first adsorption element (81), passes through the third upper-right flow path (51), the second upper-right opening (25), the second upper-right flow path (43), the inside of the first rotary damper (71), and the first right side opening (22) in that order, and then flows into the first lower flow path (42).

During the flow through the first lower flow path (42), the second air passes through the first cooling heat exchanger (93). At this time, no refrigerant is flowing in the first cooling heat exchanger (93). Accordingly, the second air just passes through the first cooling heat exchanger (93) and, therefore, neither absorbs nor liberates heat. Thereafter, the second air passes through the air discharge side outlet (16) and is discharged outdoors.

Humidification Operating Mode

Figure 7:
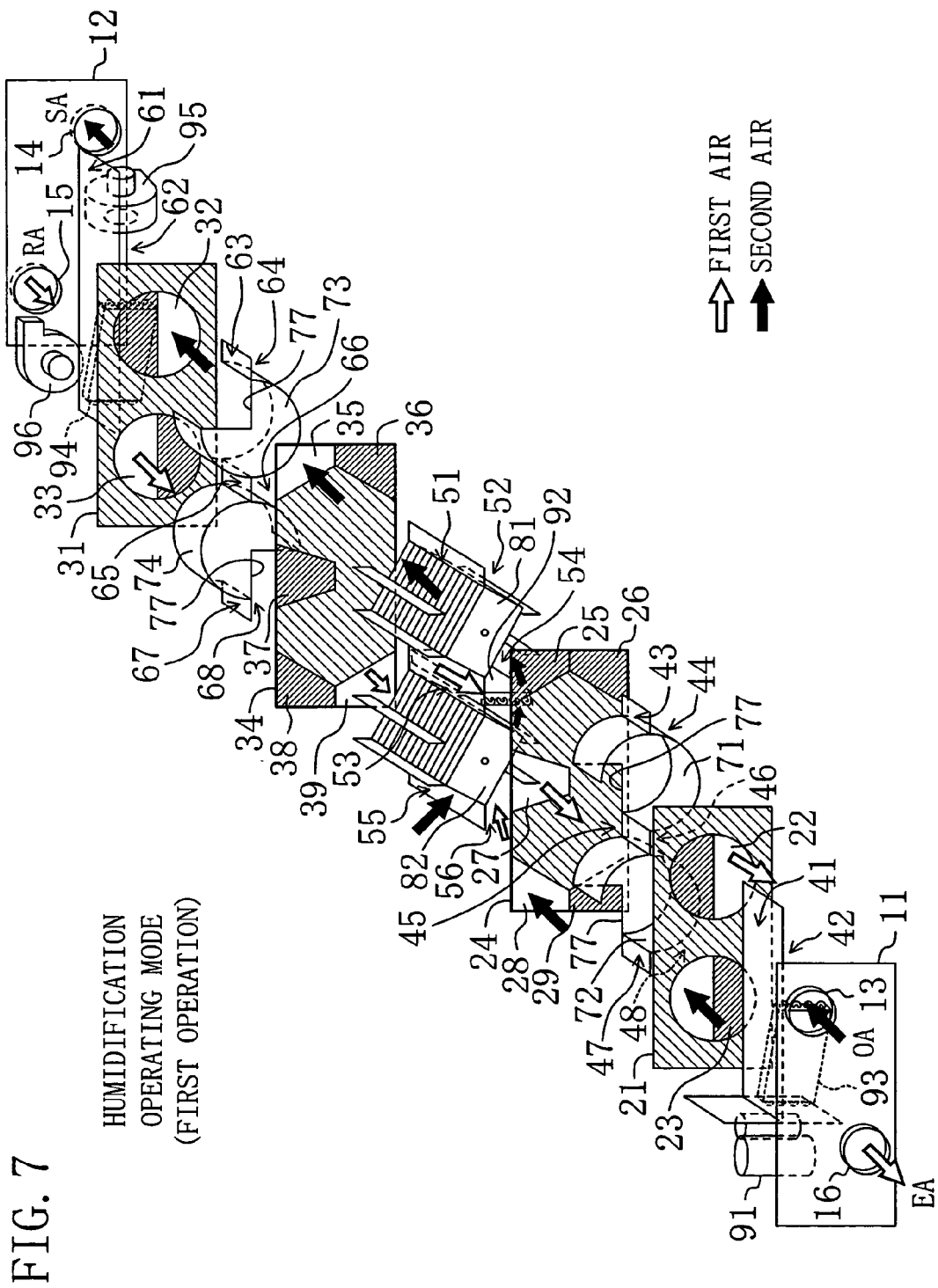
FIG. 7 is an exploded perspective view describing a first operation during the humidification operating mode of the air conditioning apparatus according to the first embodiment.
Figure 8:
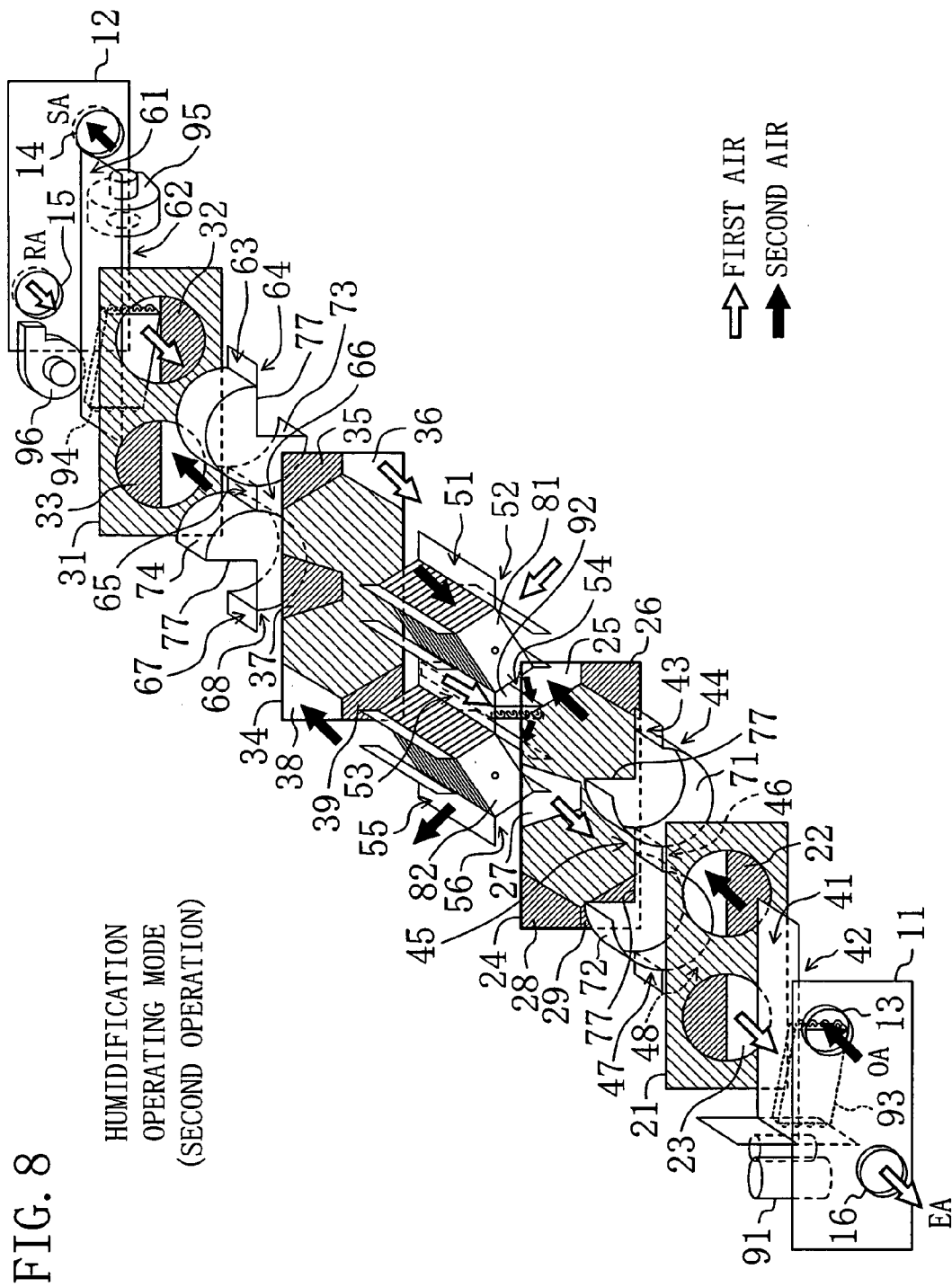
FIG. 8 is an exploded perspective view describing a second operation during the humidification operating mode of the air conditioning apparatus according to the first embodiment.

As shown in FIGS. 7 and 8, when the air supply fan (95) is activated in the humidification operating mode, outdoor air is taken into the inside of the casing (10) through the air supply side inlet (13). The outdoor air flows, as second air, into the first upper flow path (41). On the other hand, when the air discharge fan (96) is activated, indoor air is taken into the inside of the casing (10) through the air discharge side inlet (15). The indoor air flows, as first air, into the fifth upper flow path (61). Also, during the humidification operating mode, it is arranged such that the amount of outdoor air to be taken in as the first air and the amount of indoor air to be taken in as the second air are made equal, the reason for which is the same as the one described in the dehumidification operating mode.

Furthermore, in the humidification operating mode, refrigeration cycles are carried out in the refrigerant circuit, in which the regenerative heat exchanger (92) operates as a condenser and the first cooling heat exchanger (93) operates as an evaporator. Stated another way, no refrigerant flows in the second cooling heat exchanger (94) in the dehumidification operating mode. And, the humidification operating mode of the air conditioning apparatus is performed by repeating first and second operations in alternation.

Referring now to FIG. 7, the first operation of the humidification operating mode will be described. In the first operation, air is humidified by the first adsorption element (81) and the adsorbent of the second adsorption element (82) adsorbs water vapor.

In addition, in the first operation, the second upper-right opening (25), the second lower-right opening (26), and the second lower-left opening (29) are closed in the second partition plate (24). Furthermore, the third lower-right opening (36), the third central opening (37), and the third upper-left opening (38) are closed in the third partition plate (34).

An upper half portion of the first left side opening (23) is in the open state. The notched opening (77) of the second rotary damper (72) is oriented such that it is located upper left and opens to the second upper-left flow path (47). The second upper-left opening (28) of the second partition plate (24) is in the communicating state. In this state, the second air, which has flowed into the first upper flow path (41), passes through the first left side opening (23), the inside of the second rotary damper (72), the second upper-left flow path (47), and the second upper-left opening (28) in that order, and then flows into the third upper-left flow path (55).

An upper half portion of the fourth left side opening (33) is in the open state. The notched opening (77) of the fourth rotary damper (74) is oriented such that it is located lower left and opens to the fourth lower-left flow path (68). The third lower-left opening (39) of the third partition plate (34) is in the communicating state. In this state, the first air, which has flowed into the fifth upper flow path (61), passes through the fourth left side opening (33), the inside of the fourth rotary damper (74), the fourth lower-left flow path (68), and the third lower-left opening (39) in that order, and then flows into the third lower-left flow path (56).

The humidity adjusting side passageway (85) of the second adsorption element (82) is in communication with the third lower-left flow path (56) as well as with the third upper-central flow path (53). The cooling side passageway (86) of the second adsorption element (82) is in communication with the third upper-left flow path (55) as well as with the third lower-central flow path (54). In addition, the humidity adjusting side passageway (85) of the first adsorption element (81) is in communication with the third lower-central flow path (54) as well as with the third upper-right flow path (51). The cooling side passageway (86) of the first adsorption element (81) is in communication with the third upper-central flow path (53) as well as with the third lower-right flow path (52).

As also shown in FIG. 4(b), in this state, the first air flows into the humidity adjusting side passageway (85) of the second adsorption element (82) from the third lower-left flow path (56). During the flow through the humidity adjusting side passageway (85), water vapor contained in the first air is adsorbed into the adsorbent. The first air dehumidified in the humidity adjusting side passageway (85) flows into the third upper-central flow path (53).

On the other hand, the second air flows into the cooling side passageway (86) of the second adsorption element (82) from the third upper-left flow path (55). During the flow through the cooling side passageway (86), the second air absorbs heat of adsorption produced when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated in the second adsorption element (82) and the regenerative heat exchanger (92) is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. And, the water vapor desorbed from the adsorbent is given to the second air and, as a result, the second air is humidified. The second air humidified in the first adsorption element (81) flows into the third upper-right flow path (51).

The third upper-right opening (35) of the third partition plate (34) is in the communicating state. The notched opening (77) of the third rotary damper (73) is oriented such that it is located upper right and opens to the fourth upper-right flow path (63). A lower half portion of the fourth right side opening (32) is in the open state. In this state, the second air humidified in the first adsorption element (81) passes through the third upper-right flow path (51), the third upper-right opening (35), the fourth upper-right flow path (63), the inside of the third rotary damper (73), and the fourth right side opening (32) in that order, and then flows into the fifth lower flow path (62).

During the flow through the fifth lower flow path (62), the second air passes through the second cooling heat exchanger (94). At this time, no refrigerant is flowing in the second cooling heat exchanger (94). Accordingly, the second air just passes through the second cooling heat exchanger (94) and, therefore, neither absorbs nor liberates heat. And, the second air heated and humidified passes through the air supply side outlet (14) and is supplied indoors.

The second central opening (27) of the second partition plate (24) is in the communicating state. The notched opening (77) of the first rotary damper (71) is oriented such that it is located upper left and opens to the second upper-central flow path (45). A lower half portion of the first right side opening (22) is in the open state. In this state, the first air dehumidified in the second adsorption element (82) passes through the third upper-central flow path (53), the second central opening (27), the second upper-central flow path (45), the inside of the first rotary damper (71), and the first right side opening (22) in that order, and then flows into the first lower flow path (42).

During the flow through the first lower flow path (42), the first air passes through the first cooling heat exchanger (93). The first air is subjected to heat exchange with refrigerant in the first cooling heat exchanger (93) and the refrigerant in the refrigerant circuit absorbs heat from the first air and evaporates. Thereafter, the first air passes through the air discharge side outlet (16) and is discharged outdoors.

Referring to FIG. 8, the second operation of the humidification operating mode will be described. Contrary to the first operation, in the second operation, air is humidified in the second adsorption element (82) and the adsorbent of the first adsorption element (81) adsorbs water vapor.

In addition, in the second operation, the second lower-right opening (26), the second upper-left opening (28), and the second lower-left opening (29) are closed in the second partition plate (24). Furthermore, the third upper-right opening (35), the third central opening (37), and the third lower-left opening (39) are closed in the third partition plate (34).

An upper half portion of the first right side opening (22) is in the open state. The notched opening (77) of the first rotary damper (71) is oriented such that it is located upper right and opens to the second upper-right flow path (43). The second upper-right opening (25) of the second partition plate (24) is in the communicating state. In this state, the second air, which has flowed into the first upper flow path (41), passes through the first right side opening (22), the inside of the first rotary damper (71), the second upper-right flow path (43), and the second upper-right opening (25) in that order, and then flows into the third upper-right flow path (51).

An upper half portion of the fourth right side opening (32) is in the open state. The notched opening (77) of the third rotary damper (73) is oriented such that it is located lower right and opens to the fourth lower-right flow path (64). The third lower-right opening (36) of the third partition plate (34) is in the communicating state. In this state, the first air, which has flowed into the fifth upper flow path (61), passes through the fourth right side opening (32), the inside of the third rotary damper (73), the fourth lower-right flow path (64), and the third lower-right opening (36) in that order, and then flows into the third lower-right flow path (52).

At the time of switching from the first operation to the second operation, the first adsorption element (81) and the second adsorption element (82) are rotated counterclockwise relative to FIG. 4. And, the humidity adjusting side passageway (85) of the first adsorption element (81) is in communication with the third lower-right flow path (52) as well as with the third upper-central flow path (53). The cooling side passageway (86) of the first adsorption element (81) is in communication with the third upper-right flow path (51) as well as with the third lower-central flow path (54). In addition, the humidity adjusting side passageway (85) of the second adsorption element (82) is in communication with the third lower-central flow path (54) as well as with the third upper-left flow path (55). The cooling side passageway (86) of the second adsorption element (82) is in communication with the third upper-central flow path (53) as well as with the third lower-left flow path (56).

As also shown in FIG. 4(a), in this state, the first air flows into the humidity adjusting side passageway (85) of the first adsorption element (81) from the third lower-right flow path (52). During the flow through the humidity adjusting side passageway (85), water vapor contained in the first air is adsorbed into the adsorbent. The first air dehumidified in the humidity adjusting side passageway (85) flows into the third upper-central flow path (53).

On the other hand, the second air flows into the cooling side passageway (86) of the first adsorption element (81) from the third upper-right flow path (51). During the flow through the cooling side passageway (86), the second air absorbs heat of adsorption produced when water vapor is adsorbed into the adsorbent in the humidity adjusting side passageway (85). The second air, which has robbed heat of adsorption, flows into the third lower-central flow path (54). During the flow through the third lower-central flow path (54), the second air passes through the regenerative heat exchanger (92). In the regenerative heat exchanger (92), the second air is subjected to heat exchange with refrigerant and absorbs heat of condensation of the refrigerant.

The second air heated in the first adsorption element (81) and the regenerative heat exchanger (92) is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. And, the water vapor desorbed from the adsorbent is given to the second air and the second air is humidified accordingly. The second air humidified in the second adsorption element (82) flows into the third upper-left flow path (55).

The third upper-left opening (38) of the third partition plate (34) is in the communicating state. The notched opening (77) of the fourth rotary damper (74) is oriented such that it is located upper left and opens to the fourth upper-left flow path (67). A lower half portion of the fourth left side opening (33) is in the open state. In this state, the second air humidified by the second adsorption element (82) passes through the third upper-left flow path (55), the third upper-left opening (38), the fourth upper-left flow path (67), the inside of the fourth rotary damper (74), and the fourth left side opening (33) in that order, and then flows into the fifth lower flow path (62).

During the flow through the fifth lower flow path (62), the second air passes through the second cooling heat exchanger (94). At this time, no refrigerant is flowing in the second cooling heat exchanger (94). Accordingly, the second air just passes through the second cooling heat exchanger (94) and, therefore, neither absorbs nor liberates heat. And, the second air heated and humidified passes through the air supply side outlet (14) and is supplied indoors.

The second central opening (27) of the second partition plate (24) is in the communicating state. The notched opening (77) of the second rotary damper (72) is oriented such that it is located upper right and opens to the second upper-central flow path (45). A lower half portion of the first left side opening (23) is in the open state. In this state, the first air dehumidified in the first adsorption element (81) passes through the third upper-central flow path (53), the second central opening (27), the second upper-central flow path (45), the inside of the second rotary damper (72), and the first left side opening (23) in that order, and flows into the first lower flow path (42).

During the flow through the first lower flow path (42), the first air passes through the first cooling heat exchanger (93). In the first cooling heat exchanger (93), the first air is subjected to heat exchange with refrigerant, and the refrigerant in the refrigerant circuit absorbs heat from the first air and evaporates. Thereafter, the first air passes through the air discharge side outlet (16) and is discharged outdoors.

Shape of Adsorption Element

Figure 9:
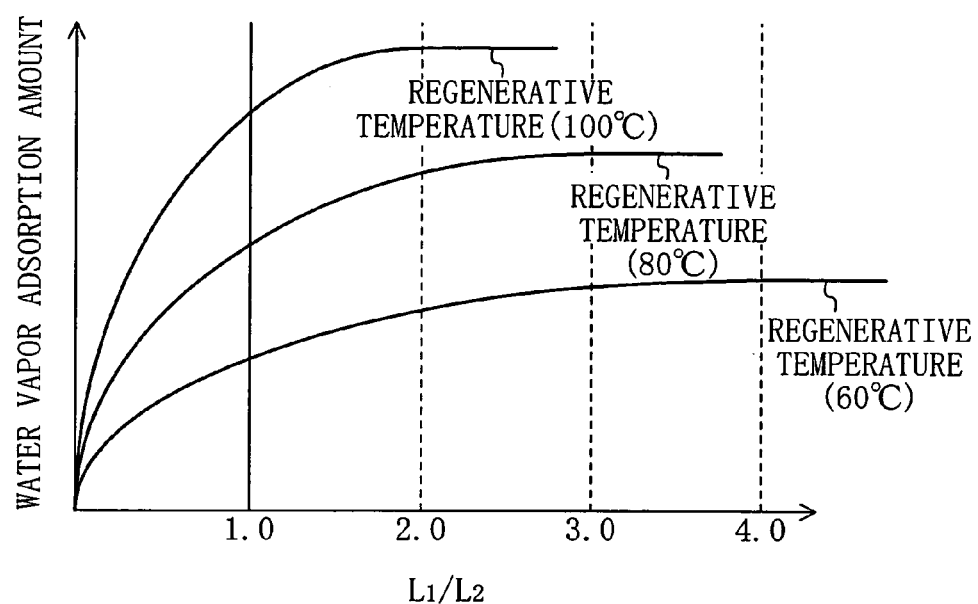
FIG. 9 is a relational diagram graphically representing a relationship between the ratio $L_1/L_2$ (the ratio in length of a shorter side to a longer side of a flat plate member) and the amount of water vapor adsorption of the adsorption element.

Here, with reference to FIGS. 3 and 9, reasons why the flat plate member (83) is formed not into a square shape but into a rectangular shape and the adsorption element (81, 82) is formed into a predetermined rectangular parallelepiped shape as described above, will be given below. FIG. 9 is a graph representing, by regeneration temperature, variations in water vapor adsorption amount of the adsorption element (81, 82) when changing the ratio $L_1/L_2$ (i.e., the shorter side-to-longer side ratio of the flat plate member (83)), provided that the volume of the adsorption element (81, 82), i.e., $V=L_1 \times L_2 \times W$), is constant. By "regeneration temperature" as used here, what is meant is the temperature of the second air that is supplied to the adsorption element (81, 82) from the regenerative heat exchanger (92) which operates as a heater.

As shown in FIG. 3, the area of opposing side surfaces of the adsorption element (81, 82) of the present embodiment which are located on the longer-side side of the flat plate members (83) is $S_1=L_1 \times W$, and the humidity adjusting side passageways (85) are opened on these side surfaces. Additionally, the area of another opposing side surfaces of the adsorption element (81, 82) which are located on the shorter-side side of the flat plate members (83) is $S_2=L_2 \times W$, and the cooling side passageways (86) are opened on these side surfaces.

If $L_1=L_2$ (i.e., in the case where the flat plate members (83) are square-shaped), then $S_1=S_2$. As the value of $L_1/L_2$ increases, the area $S_1$ gradually increases and, on the other hand, the area $S_2$ gradually decreases. Accordingly, as the $L_1/L_2$ value increases, the opening area of the humidity adjusting side passageways (85) in the side surfaces of the adsorption element (81, 82), i.e., the passageway cross-sectional area of the humidity adjusting side passageways (85), gradually increases and, on the other hand, the opening area of the cooling side passageways (86) in the side surfaces of the adsorption element (81, 82), i.e., the passageway cross-sectional area of the cooling side passageways (86), gradually decreases. As a result, in comparison with the case where the flat plate members (83) are square-shaped, the flow velocity of air in the cooling side passageways (86) increases and the flow velocity of air in the humidity adjusting side passageways (85) decreases in the adsorption element (81, 82).

If the flow velocity of air in the cooling side passageway (86) increases as described above, this increases the rate of heat transfer between air flowing through the cooling side passageway (86) and the flat plate member (83), thereby increasing the quantity of heat transferring from air present in the humidity adjusting side passageway (85) to the air present in the cooling side passageway (86). As a result, the rise in temperature of the air flowing through the humidity adjusting side passageway (85) is suppressed, and the relative humidity of the air is held high and the amount of water vapor that the adsorbent adsorbs increases. Additionally, if the flow velocity of air in the humidity adjusting side passageway (85) becomes slower, this makes it possible to gain the time for air to contact with the adsorbent in the humidity adjusting side passageway (85). This also contributes to increasing the amount of water vapor that the adsorbent adsorbs.

Accordingly, as shown in FIG. 9, as the $L_1/L_2$ value increases, the amount of water vapor adsorption of the adsorption element (81, 82) will increases. At that time, as the $L_1/L_2$ value increases, the rate of increase in the amount of water vapor adsorption in the adsorption element (81, 82) gradually decreases. And, when the $L_1/L_2$ value reaches a value in excess of a certain level, the amount of water vapor adsorption will hardly increase even when the $L_1/L_2$ is further increased. Stated another way, increasing the $L_1/L_2$ value at random only results in the fact that the shape of the adsorption element (81, 82) becomes flat, thereby increasing the size thereof As a result, any increase in water vapor adsorption amount will no longer be expected.

For example, if the regeneration temperature is 100 degrees Centigrade, any increase in water vapor adsorption amount will hardly be expected even when the $L_1/L_2$ value is increased to above 2.0. Accordingly, in this case, desirably the adsorption element (81, 82) is formed such that a condition of $1.0<L_1/L_2 \leq 2.0$ holds, more preferably a condition of $1.5 \leq L_1/L_2 \leq 2.0$ holds.

Additionally, if the regeneration temperature is 80 degrees Centigrade, the increase in water vapor adsorption amount will hardly be expected even when the $L_1/L_2$ value is increased to above 3.0. Accordingly, in this case, desirably the adsorption element (81, 82) is formed such that a condition of $1.0<L_1/L_2 \leq 3.0$ holds. At that time, when giving importance to the downsizing of the adsorption element (81, 82), the adsorption element (81, 82) should be formed such that a condition of $1.0<L_1/L_2 \leq 2.0$ holds (for example, $L_1/L_2=1.5$). On the other hand, when giving importance to the performance of the adsorption element (81, 82), the adsorption element (81, 82) should be formed such that a condition of $2.0 \leq L_1/L_2 \leq 3.0$ holds (for example, $L_1/L_2=2.5$).

Furthermore, if the regeneration temperature is 60 degrees Centigrade, any increase in water vapor adsorption amount will hardly be expected even when the $L_1/L_2$ value is increased to above 4.0. Accordingly, in this case, desirably the adsorption element (81, 82) is formed such that a condition of $1.0<L_1/L_2 \leq 4.0$ holds. At that time, when giving importance to the downsizing of the adsorption element (81, 82), the adsorption element (81, 82) should be formed such that a condition of $2.0<L_1/L_2 \leq 3.0$ holds (for example, $L_1/L_2=2.5$). On the other hand, when giving importance to the performance of the adsorption element (81, 82), the adsorption element (81, 82) should be formed such that a condition of $3.0 \leq L_1/L_2 \leq 4.0$ holds (for example, $L_1/L_2=3.5$).

Here, in the air conditioning apparatus of the present embodiment, the second air is heated by heat of condensation of the refrigerant in the regenerative heat exchanger (92). Because of this, when taking into consideration operating conditions in a normal refrigeration cycle, the regeneration temperature in the air conditioning apparatus is around 60 degrees Centigrade. Accordingly, in the air conditioning apparatus, it is desirable that the adsorption element (81, 82) is formed such that a condition of $1.0<L_1/L_2 \leq 4.0$ holds.

In the present embodiment, in the light of giving importance to the downsizing of the adsorption element (81, 82), the adsorption element (81, 82) is formed such that $L_1/L_2 = 2.0$. Even in such a case, an increase of a bit less than 35% in water vapor adsorption amount of the adsorption element (81, 82) is expected in comparison with the case where $L_1/L_2=1.0$.

Effects of First Embodiment

In the first embodiment, the flat plate members (83) constituting the adsorption element (81, 82) are rectangular plate-shaped. Because of this, in accordance with the adsorption element (81, 82) of the first embodiment, the flow velocity of air in the cooling side passageway (86) is increased by reducing the opening area of the cooling side passage way (86) for the flow of cooling air and, at the same time, the flow velocity of air in the humidity adjusting side passageway (85) coated with adsorbent is decreased by expanding the opening area of the humidity adjusting side passageway (85), when compared to the conventional arrangement that the flat plate members (83) are square-shaped.

As the result of the above, the flow velocity of air in the cooling side passageway (86) is increased while ensuring contact of air with the adsorbent in the humidity adjusting side passageway (85), whereby it becomes possible to increase the quantity of heat transferring from air in the humidity adjusting side passageway (85) to air in the cooling side passageway (86). Accordingly, the first embodiment makes it possible to increase the quantity of heat of adsorption that air in the cooling side passageway (86) absorbs while ensuring contact of air with the adsorbent in the humidity adjusting side passageway (85), whereby the ability of adsorption of the adsorption element (81, 82) is enhanced.

Additionally, the use of the adsorption element (81, 82) of the first embodiment makes it possible to reduce the size of air conditioning apparatus. This will be described with reference to FIG. 10.

In the first place, when the flat plate members (83) constituting the adsorption element (81, 82) are square-shaped and the length of the four sides of the flat plate member (83) is "1", the height of the casing (10) of the air conditioning apparatus, $h_1$, is always greater than the length of the diagonal lines of the flat plate member (83), i.e., "1.41". On the other hand, in the case where the flat plate members (83) constituting the adsorption element (81, 82) are rectangle-shaped, the length of the shorter sides of the flat plate member (83) is "0.71" and the length of the longer sides is "1.41", provided that the area of the flat plate member (83) is constant. This accordingly makes it possible to reduce the height of the air conditioning apparatus, $h_2$, down to "1.27". Therefore, in accordance with the first embodiment, the casing (10) of the air conditioning apparatus is made thinner. As a result, the downsizing of air conditioning apparatus is achieved.

In addition to the above, the use of the adsorption element (81, 82) of the first embodiment makes it possible to reduce the power required for rotatably driving the adsorption element (81, 82). In other words, as shown in FIG. 10, if the flat plate members (83) constituting the adsorption element (81, 82) are square-shaped, this requires that the adsorption element (81, 82) be rotated an angle of $\theta_1=90$ degrees, when performing switching between the first operation and the second operation. On the other hands, if the flat plate members (83) constituting the adsorption element (81, 82) are rectangle-shaped as in the first embodiment, it suffices if the adsorption element (81, 82) is rotated just an angle of $\theta_2=53.1$ degrees, when performing switching between the first operation and the second operation. Therefore, in accordance with the first embodiment, the angle of rotation of the adsorption element (81, 82) can be made less than conventional, thereby reducing the power required for rotatably driving the adsorption element (81, 82).

Here, when performing switching between the first operation and the second operation in the air conditioning apparatus described above, there temporarily occurs a state in which the first air and the second air are mixed together around the adsorption element (81, 82). In other words, there is a certain period of time during which the dehumidification or humidification of air that is supplied indoors is carried out inadequately. On the other hand, in accordance with the first embodiment, the angle of rotation of the adsorption element (81, 82) is diminished. Therefore, in accordance with the first embodiment, the time taken to perform switching between the first operation and the second operation by rotation of the adsorption element (81, 82) is shortened, thereby ensuring that air that is supplied indoors is dehumidified or humidified.

Modification Example of First Embodiment

Although in the first embodiment both the air supply fan (95) and the air discharge fan (96) are disposed on the side of the indoor side panel (12) in the casing (10), these fans may be disposed in an alternative manner. In other words, contrary to the first embodiment, both the air supply fan (95) and the air discharge fan (96) may be disposed on the side of the outdoor side panel (11). In addition, it may be arranged such that either one of the air supply fan (95) and the air discharge fan (96) is disposed on the side of the indoor side panel (12) and the other fan is disposed on the side of the outdoor side panel (11).

Second Embodiment of Invention

An air conditioning apparatus according to a second embodiment of the present invention is so constructed as to switchably perform a dehumidification operating mode in which outside air dehumidified and cooled is supplied indoors and a humidification operating mode in which outside air heated and humidified is supplied indoors. In addition, the air conditioning apparatus of the second embodiment comprises two adsorption elements (81, 82) and is so constructed as to perform a so-called batch operation. The air conditioning apparatus of the second embodiment differs from the first embodiment in that the adsorption elements (81, 82) are fixed, in other words they do not rotate.

Figure 11:
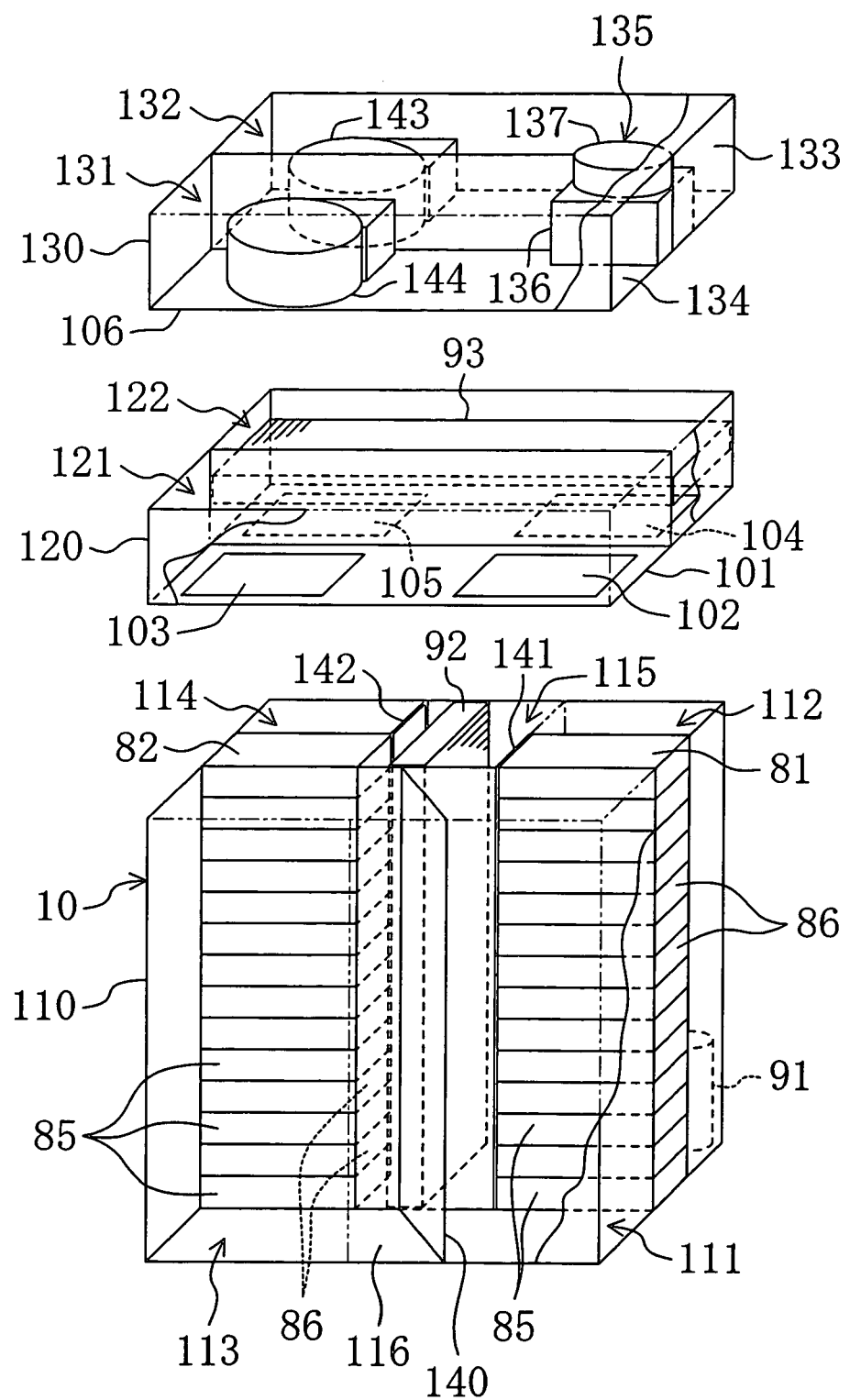
FIG. 11 is an exploded perspective view showing an arrangement of an air conditioning apparatus according to a second embodiment of the present invention.

As shown in FIG. 11, the air conditioning apparatus of the second embodiment comprises an oblong, rectangular parallelepiped-shaped casing (10). The casing (10) houses, in addition to the two adsorption elements (81, 82), a single refrigerant circuit. The adsorption elements (81, 82) are identical with their counterparts of the first embodiment and, therefore, the description thereof is omitted.

The refrigerant circuit is a closed circuit formed by piping connection of a compressor (91), a regenerative heat exchanger (92) which operates a condenser, an expansion valve, and a cooling heat exchanger (93) which operates as an evaporator. Diagrammatic representation of the entire arrangement of the refrigerant circuit and the expansion valve is omitted. The refrigerant circuit is so constructed as to perform a vapor compression refrigeration cycle by circulating a refrigerant charged therein.

The casing (10) houses a first partition panel (101) and a second partition panel (106). The first partition panel (101) and the second partition panel (106) are disposed vertically in that order, thereby dividing the internal space of the casing (10) into upper and lower spaces. In addition, in the casing (10), a part underlying the first partition panel (101) constitutes a lower section (110), and a part interposing between the first partition panel (101) and the second partition panel (106) constitutes a middle section (120), and a part overlying the second partition panel (106) constitutes an upper section (130).

In the lower section (110) of the casing (10), the two adsorption elements (81, 82).are arranged, in a lateral row, centrally relative to the front-rear direction. The adsorption elements (81, 82) are standingly disposed in such orientation that their longitudinal directions extend vertically. And, the first adsorption element (81) is disposed at the right of the lower section (110), and the second adsorption element (82) is disposed at the left of the lower section (110). In this state, the cooling side passageways (86) of the first adsorption element (81) are opened on a right side surface of the casing (10). On the other hand, the cooling side passageways (86) of the second adsorption element (82) are opened on a left side surface of the casing (10).

In a right-hand side part of the lower section (110), a lower right-front flow path (111) is divisionally formed in front of the first adsorption element (81), and a lower right-rear flow path (112) is divisionally formed at the rear of the first adsorption element (81). The compressor (91) of the refrigerant circuit is housed in the lower right-rear flow path (112). On the other hand, in a left-hand side part of the lower section (110), a lower left-front flow path (113) is divisionally formed in front of the second adsorption element (82), and a lower left-rear flow path (114) is divisionally formed at the rear of the second adsorption element (82).

Additionally, in the inside of the lower section (110), a lower central flow path (115) is divisionally formed between the first adsorption element (81) and lower right-rear flow path (112), and the second adsorption element (82) and lower left-rear flow path (114). The lower central flow path (115) constitutes an air flow path for regeneration. And, the regenerative heat exchanger (92) is so disposed as to cross the lower central flow path (115).

In a front surface of the lower section (110), an oblong, rectangle-shaped suction opening (116) is opened centrally relative to the horizontal direction. The lower section (110) is provided, at a position thereof corresponding to the suction opening (116), with a turning damper (140). The turning damper (140) is an oblong, rectangle-shaped plate and rotates on its rear end as an axis. By virtue of the operation of the turning damper (140), switching between a state in which the suction opening (116) communicates only with the lower right-front flow path (111), and a state in which the suction opening (116) communicates only with the lower left-front flow path (113), is made.

Furthermore, the lower section (110) houses two slide dampers (141, 142) which are oblong, rectangle-shaped plates.

The first slide damper (141), disposed between the first adsorption element (81) and lower right-rear flow path (112), and the lower central flow path (115), is formed movably back and forth. By virtue of the operation of the first slide damper (141), switching between a state in which the cooling side passageway (86) of the first adsorption element (81) is disconnected from the lower central flow path (115) and the lower right-rear flow path (112) comes into communication with the lower central flow path (115), and a state in which the cooling side passageway (86) of the first adsorption element (81) comes into communication with the lower central flow path (115) and the lower right-rear flow path (112) is disconnected from the lower central flow path (115), is made.

The second slide damper (142), disposed between the second adsorption element (82) and lower left-rear flow path (114), and the lower central flow path (115), is formed movably back and forth. By virtue of the operation of the second slide damper (142), switching between a state in which the cooling side passageway (86) of the second adsorption element (82) is disconnected from the lower central flow path (115) and the lower left-rear flow path (114) comes into communication with the lower central flow path (115), and a state in which the cooling side passageway (86) of the second adsorption element (82) comes into communication with the lower central flow path (115) and the lower left-rear flow path (114) is disconnected from the lower central flow path (115), is made.

The internal space of the middle section (120) is divided into a front-side portion and a rear-side portion, in other words a middle front-side flow path (121) and a middle rear-side flow path (122) are divisionally formed on the front and rear sides of the middle section (120), respectively.

A right-front opening (102) is formed in a right-front corner of the first partition panel (101). A left-front opening (103) is formed in a left-front corner of the first partition panel (101). The right-front opening (102) is openable and closable and brings the lower right-front flow path (111) and the middle front-side flow path (121) into communication with each other. The left-front opening (103) is openable and closable and brings the lower left-front flow path (113) and the middle front-side flow path (121) into communication with each other.

In addition, a right-rear opening (104) is formed in a right-rear corner of the first partition panel (101). A left-rear opening (105) is formed in a left-rear corner of the first partition panel (101). The right-rear opening (104) is openable and closable and brings the lower right-rear flow path (112) and the middle rear-side flow path (122) into communication with each other. The left-rear opening (105) is openable and closable and brings the lower left-rear flow path (114) and the middle rear-side flow path (122) into communication with each other.

The internal space of the upper section (130) is divided into a front-side portion and a rear-side portion, in other words an upper front-side flow path (131) and an upper rear-side flow path (132) are divisionally formed on the front and rear sides of the upper section (130), respectively. The upper front-side flow path (131) is provided with a second fan (144). The upper front-side flow path (131) is brought into communication with the middle front-side flow path (121) by the second fan (144). The upper rear-side flow path (132) is provided with a first fan (143). The upper rear-side flow path (132) is brought into communication with the middle rear-side flow path (122) by the first fan (143).

A first air discharge opening (133) and a second air discharge opening (134) are opened on a right end surface of the upper section (130). The first air discharge opening (133) brings the upper rear-side flow path (132) into communication with the casing (10). The second air discharge opening (134) brings the upper front-side flow path (131) into communication with the casing (10). In addition, the first air discharge opening (133) and the second air discharge opening (134) are formed such that, when one of them is placed in the open state, the other is placed in the closed state.

An air supply opening (135) is disposed to the right end of the upper section (130). The air supply opening (135) comprises a box-shaped member (136) and a cylinder-shaped member (137) placed on the box-shaped member (136). The box-shaped member (136) of the air supply opening (135) is formed such that its front and rear surfaces are openable and closable. When the front surface of the box-shaped member (136) is placed in the open state, the upper front-side flow path (131) comes into communication with the inside of the box-shaped member (136). On the other hand, when the rear surface of the box-shaped member (136) is placed in the open state, the upper rear-side flow path (132) comes into communication with the inside of the box-shaped member (136).

Running Operation

Figure 12:
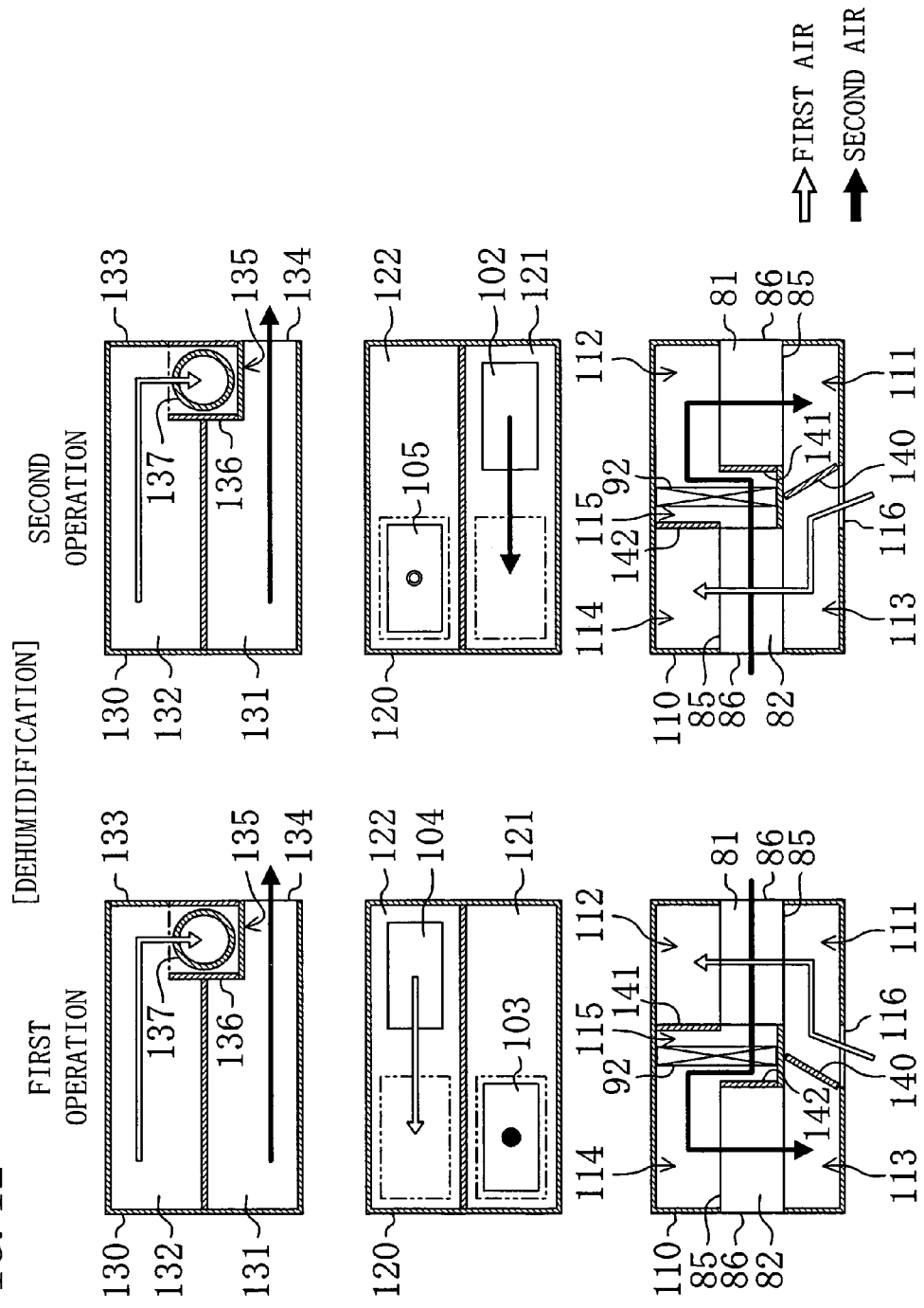
FIG. 12 is a diagram typically showing a dehumidification operating mode of the air conditioning apparatus according to the second embodiment.
Figure 13:
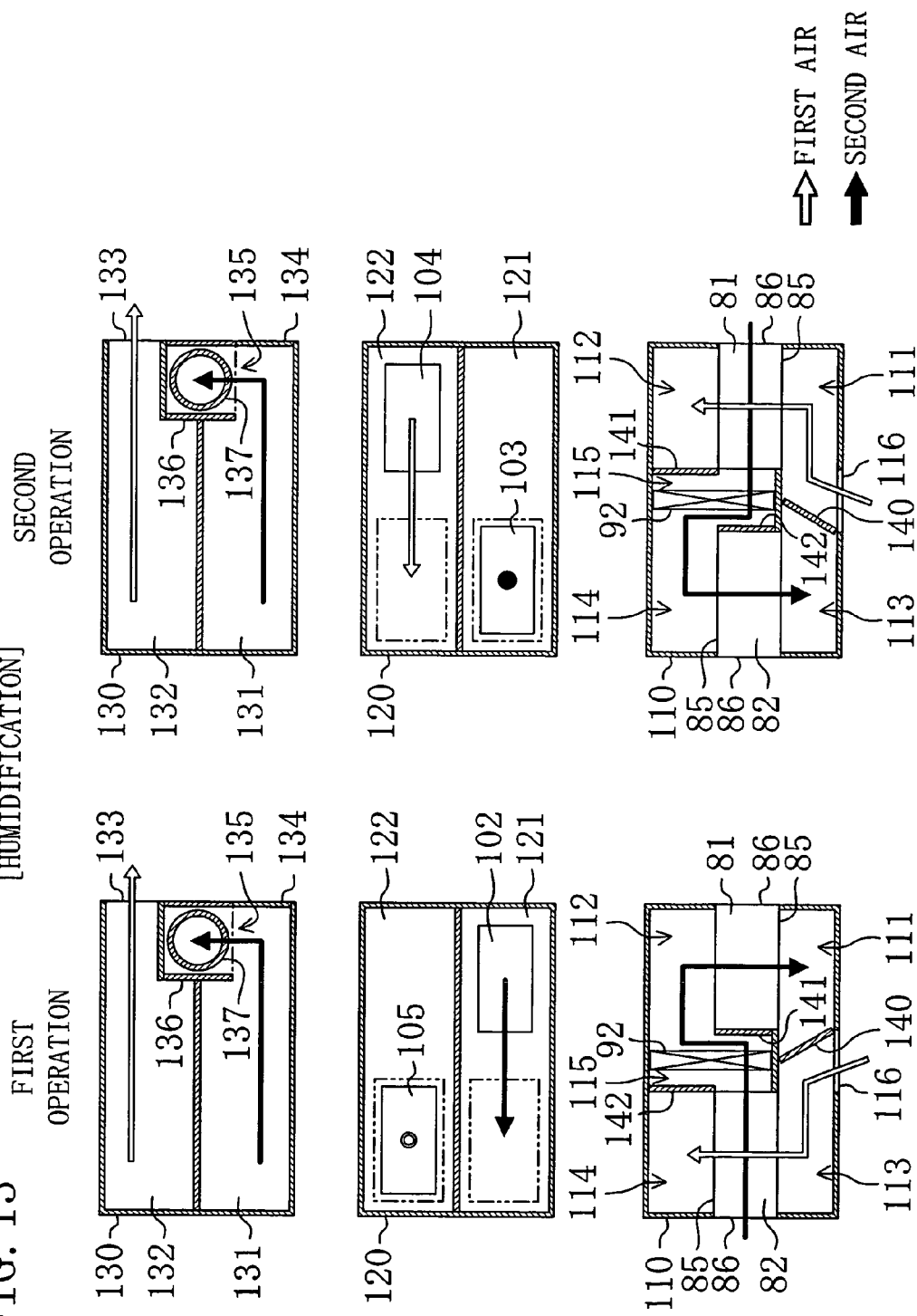
FIG. 13 is a diagram typically showing a humidification operating mode of the air conditioning apparatus according to the second embodiment.

The running operation of the air conditioning apparatus will be described with reference to FIGS. 11–13. Note that FIGS. 12 and 13 provide typical diagrammatic representations of the upper section (130), the middle section (120), and the lower section (110) when viewed from above.

Dehumidification Operating Mode

The air conditioning apparatus performs a dehumidification operating mode by repeating in alternation a first operation and a second operation. During that time, the first fan (143) and the second fan (144) are activated and refrigeration cycles are carried out by causing refrigerant to circulate in the refrigerant circuit. Here, the first and second operations in the dehumidification operating mode will be described with reference to FIG. 12.

In the first operation of the dehumidification operating mode, air is dehumidified in the first adsorption element (81) and, at the same time, the adsorbent of the second adsorption element (82) is regenerated.

In the lower section (110), the turning damper (140) is turned to the left, and the suction opening (116) comes into communication with the lower right-front flow path (111). In addition, the first slide damper (141) moves and, as a result, the cooling side passageway (86) of the first adsorption element (81) comes into communication with the lower central flow path (115), and the second slide damper (142) moves and, as a result, the lower left-rear flow path (114) comes into communication with the lower central flow path (115).

In this state, outdoor air flows, as first air, into the lower right-front flow path (111) from the suction opening (116). The first air flows into the humidity adjusting side passageway (85) of the first adsorption element (81) from the lower right-front flow path (111). During the flow through the humidity adjusting side passageway (85), water vapor contained in the first air is adsorbed into the adsorbent. The first air dehumidified in the humidity adjusting side passageway (85) flows into the lower right-rear flow path (112).

On the other hand, outdoor air flows, as second air, into the cooling side passageway (86) of the first adsorption element (81) which is opened on the right side surface of the lower section (110). During the flow through the cooling side passageway (86), the second air absorbs heat of adsorption produced when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated in the first adsorption element (81) and the regenerative heat exchanger (92) flows through the lower left-rear flow path (114) and is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. The water vapor desorbed from the adsorbent flows, together with the second air, into the lower left-front flow path (113).

In the first partition panel (101), the right-rear opening (104) and the left-front opening (103) are placed in the open state and the right-front opening (102) and the left-rear opening (105) are placed in the closed state. In the upper section (130), the second air discharge opening (134) is placed in the open state, and the first air discharge opening (133) is placed in the closed state. In the air supply opening (135), the front surface of the box-shaped member (136) is placed in the closed state and the rear surface thereof is placed in the open state.

In this state, the first air dehumidified by the first adsorption element (81) passes through the right-rear opening (104) from the lower right-rear flow path (112) and flows into the middle rear-side flow path (122). During the flow through the middle rear-side flow path (122), the first air passes through the cooling heat exchanger (93). In the cooling heat exchanger (93), the first air is subjected to heat exchange with refrigerant and liberates heat to the refrigerant. Thereafter, the first air is drawn in to the first fan (143) and flows into the upper rear-side flow path (132). And, the first air dehumidified and cooled flows into the box-shaped member (136) of the air supply opening (135) and is supplied indoors.

On the other hand, the second air, which has flowed out of the second adsorption element (82), passes through the left-front opening (103) from the lower left-front flow path (113) and flows into the middle front-side flow path (121). The second air of the middle front-side flow path (121) is drawn in to the second fan (144) and flows into the upper front-side flow path (131). Thereafter, the second air passes through the second air discharge opening (134) and is discharged outdoors.

In the second operation of the dehumidification operating mode, contrary to the first operation, air is dehumidified in the second adsorption element (82) and, at the same time, the adsorbent of the first adsorption element (81) is regenerated.

In the lower section (110), the turning damper (140) is turned to the right, and the suction opening (116) comes into communication with the lower left-front flow path (113). In addition, the first slide damper (141) moves and, as a result, the lower right-rear flow path (112) comes into communication with the lower central flow path (115), and the second slide damper (142) moves and, as a result, the cooling side passageway (86) of the second adsorption element (82) comes into communication with the lower central flow path (115).

In this state, outdoor air flows, as first air, into the lower left-front flow path (113) from the suction opening (116). Then, the first air flows into the humidity adjusting side passageway (85) of the second adsorption element (82) from the lower left-front flow path (113). During the flow through the humidity adjusting side passageway (85), water vapor contained in the first air is adsorbed into the adsorbent. The first air dehumidified in the humidity adjusting side passageway (85) flows into the lower left-rear flow path (114).

On the other hand, outdoor air flows, as second air, into the cooling side passageway (86) of the second adsorption element (82) which is opened on the left side surface of the lower section (110). During the flow through the cooling side passageway (86), the second air absorbs heat of adsorption produced when water vapor is adsorbed into the adsorbent in the humidity adjusting side passageway (85). The second air, which has robbed beat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated in the second adsorption element (82) and the regenerative heat exchanger (92) flows through the lower right-rear flow path (112) and is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. The water vapor desorbed from the adsorbent flows, together with the second air, into the lower right-front flow path (111).

In the first partition panel (101), the right-front opening (102) and the left-rear opening (105) are placed in the open state and the right-rear opening (104) and the left-front opening (103) are placed in the closed state. In the upper section (130), the second air discharge opening (134) is placed in the open state and the first air discharge opening (133) is placed in the closed state. In the air supply opening (135), the front surface of the box-shaped member (136) is placed in the closed state, and the rear surface thereof is placed in the open state.

In this state, the first air dehumidified in the second adsorption element (82) passes through the left-rear opening (105) from the lower left-rear flow path (114) and flows into the middle rear-side flow path (122). During the flow through the middle rear-side flow path (122), the first air passes through the cooling heat exchanger (93). In the cooling heat exchanger (93), the first air is subjected to heat exchange with refrigerant and liberates heat to the refrigerant. Thereafter, the first air is drawn in to the first fan (143) and flows into the upper rear-side flow path (132). And, the first air dehumidified and cooled flows into the box-shaped member (136) of the air supply opening (135) and is supplied indoors.

On the other hand, the second air, which has flowed out of the first adsorption element (81), passes through the right-front opening (102) from the lower right-front flow path (111) and flows into the middle front-side flow path (121). The second air of the middle front-side flow path (121) is drawn in to the second fan (144) and flows into the upper front-side flow path (131). Thereafter, the second air passes through the second air discharge opening (134) and is discharged outdoors.

Humidification Operating Mode

The air conditioning apparatus performs a humidification operating mode by repeating in alternation a first operation and a second operation. During that time, the first fan (143) and the second fan (144) are activated and refrigeration cycles are carried out by causing refrigerant to circulate in the refrigerant circuit. Here, the first and second operations in the humidification operating mode will be described with reference to FIG. 13.

In the first operation of the humidification operating mode, air is humidified in the first adsorption element (81) and, at the same time, water vapor is adsorbed into the adsorbent of the second adsorption element (82).

In the lower section (110), the turning damper (140) is turned to the right, and the suction opening (116) comes into communication with the lower left-front flow path (113). Additionally, the first slide damper (141) moves and, as a result, the lower right-rear flow path (112) comes into communication with the lower central flow path (115), and the second slide damper (142) moves and, as a result, the cooling side passageway (86) of the second adsorption element (82) comes into communication with the lower central flow path (115).

In this state, outdoor air flows, as first air, into the lower left-front flow path (113) from the suction opening (116). Then, the first air flows into the humidity adjusting side passageway (85) of the second adsorption element (82) from the lower left-front flow path (113). During the flow through the humidity adjusting side passageway (85), water vapor contained in the first air is adsorbed into the adsorbent. The first air dehumidified in the humidity adjusting side passageway (85) flows into the lower left-rear flow path (114).

On the other hand, outdoor air flows, as second air, into the cooling side passageway (86) of the second adsorption element (82) which is opened on the left side surface of the lower section (110). During the flow through the cooling side passageway (86), the second air absorbs heat of adsorption produced when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated in the second adsorption element (82) and the regenerative heat exchanger (92) flows through the lower right-rear flow path (112) and is introduced into the humidity adjusting side passageway (85) of the first adsorption element (81). In the humidity adjusting side passageway (85), the adsorbent is heated by the second air and, as a result, water vapor is desorbed from the adsorbent. In other words, the adsorbent is regenerated. The water vapor desorbed from the adsorbent is given to the second air, so that the second air is humidified. The second air humidified in the first adsorption element (81) flows into the lower right-front flow path (111).

In the first partition panel (101), the right-front opening (102) and the left-rear opening (105) are placed in the open state and the right-rear opening (104) and the left-front opening (103) are placed in the closed state. In the upper section (130), the first air discharge opening (133) is placed in the open state and the second air discharge opening (134) is placed in the closed state. In the air supply opening (135), the front surface of the box-shaped member (136) is placed in the open state and the rear surface thereof is placed in the closed state.

In this state, the second air humidified in the first adsorption element (81) passes through the right-front opening (102) from the lower right-front flow path (111) and flows into the middle front-side flow path (121). The second air of the middle front-side flow path (121) is drawn in to the second fan (144) and flows into the upper front-side flow path (131). And, the second air heated and humidified flows into the box-shaped member (136) of the air supply opening (135) and is supplied indoors.

On the other hand, the first air dehumidified in the second adsorption element (82) passes through the left-rear opening (105) from the lower left-rear flow path (114) and flows into the middle rear-side flow path (122). During the flow through the middle rear-side flow path (122), the first air passes through the cooling heat exchanger (93). In the cooling heat exchanger (93), the first air is subjected to heat exchange with refrigerant and the refrigerant in the refrigerant circuit absorbs heat from the first air. Thereafter, the first air is drawn in to the first fan (143) and flows into the upper rear-side flow path (132). Then, the first air passes through the first air discharge opening (133) and is discharged outdoors.

In the second operation of the humidification operating mode, contrary to the first operation, air is humidified in the second adsorption element (82) and, at the same time, water vapor is adsorbed into the adsorbent of the first adsorption element (81).

In the lower section (110), the turning damper (140) is turned to the left and, as a result, the suction opening (116) comes into communication with the lower right-front flow path (111). Additionally, the first slide damper (141) moves and, as a result, the cooling side passageway (86) of the first adsorption element (81) comes into communication with the lower central flow path (115), and the second slide damper (142) moves and, as a result, the lower left-rear flow path (114) comes into communication with the lower central flow path (115).

In this state, outdoor air flows, as first air, into the lower right-front flow path (111) from the suction opening (116). The first air flows into the humidity adjusting side passageway (85) of the first adsorption element (81) from the lower right-front flow path (111). During the flow through the humidity adjusting side passageway (85), water vapor contained in the first air is adsorbed into the adsorbent. The first air dehumidified in the humidity adjusting side passageway (85) flows into the lower right-rear flow path (112).

On the other hand, outdoor air flows, as second air, into the cooling side passageway (86) of the first adsorption element (81) which is opened on the right side surface of the lower section (110). During the flow through the cooling side passageway (86), the second air absorbs heat of adsorption produced when water vapor is adsorbed into the adsorbent in the humidity adjusting side passageway (85). The second air, which has robbed heat of adsorption, flows into the lower central flow path (115). During the flow through the lower central flow path (115), the second air passes through the regenerative heat exchanger (92). In the regenerative heat exchanger (92), the second air is subjected to heat exchange with refrigerant and absorbs heat of condensation of the refrigerant.

The second air heated in the first adsorption element (81) and the regenerative heat exchanger (92) flows through the lower left-rear flow path (114) and is introduced into the humidity adjusting side passageway (85) of the second adsorption element (82). In the humidity adjusting side passageway (85), the adsorbent is heated by the second air and, as a result, water vapor is desorbed from the adsorbent. In other words, the adsorbent is regenerated. The water vapor desorbed from the adsorbent is given to the second air, so that the second air is humidified. The second air humidified in the second adsorption element (82) flows into the lower left-front flow path (113).

In the first partition panel (101), the right-rear opening (104) and the left-front opening (103) are placed in the open state and the right-front opening (102) and the left-rear opening (105) are placed in the closed state. In the upper section (130), the first air discharge opening (133) is placed in the open state and the second air discharge opening (134) is placed in the closed state. In the air supply opening (135), the front surface of the box-shaped member (136) is placed in the open state and the rear surface thereof is placed in the closed state.

In this state, the second air humidified in the second adsorption element (82) passes through the left-front opening (103) from the lower left-front flow path (113) and flows into the middle front-side flow path (121). The second air in the middle front-side flow path (121) is drawn in to the second fan (144) and flows into the upper front-side flow path (131). And, the second air heated and humidified flows into the box-shaped member (136) of the air supply opening (135) and is supplied indoors.

On the other hand, the first air dehumidified in the first adsorption element (81) passes through the right-rear opening (104) from the lower right-rear flow path (112) and flows into the middle rear-side flow path (122). During the flow through the middle rear-side flow path (122), the first air passes through the cooling heat exchanger (93). In the cooling heat exchanger (93), the first air is subjected to heat exchange with refrigerant and the refrigerant in the refrigerant circuit absorbs heat from the first air. Thereafter, the first air is drawn in to the first fan (143) and flows into the upper rear-side flow path (132). Then, the first air passes through the first air discharge opening (133) and is discharged outdoors.

OTHER EMBODIMENTS OF INVENTION

First Modification Example

The adsorption element (81, 82) of the present invention may be constructed as follows.

Figure 14:
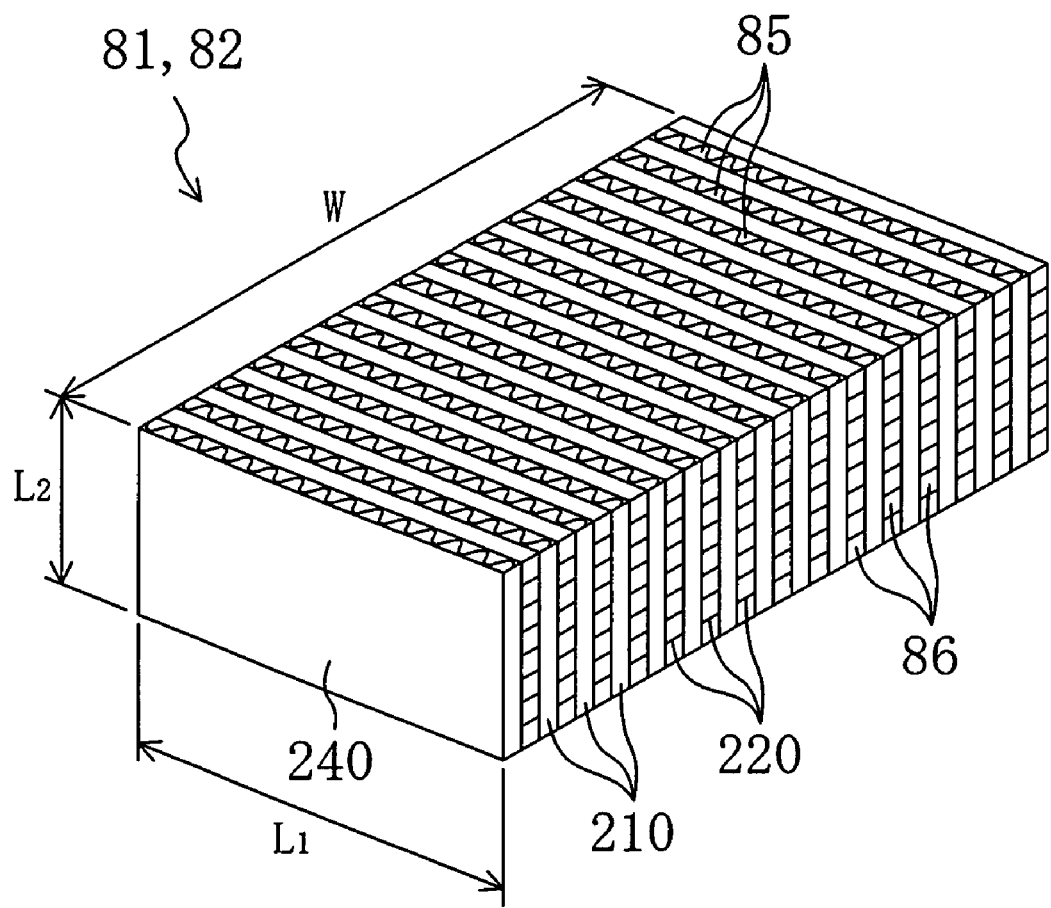
FIG. 14 is a schematic perspective view showing an adsorption element according to a first modification example of another embodiment of the present invention.

As shown in FIG. 14, the adsorption element (81, 82) of the first modification example is rectangular parallelepiped-shaped by an alternating lamination of first members (210) and second members (220).

In the rectangular parallelepiped-shaped adsorption element (81, 82), humidity adjusting side passageways (85) and cooling side passageways (86) are opened on side surfaces of the adsorption element (81, 82) in parallel with the lamination direction of the first and second members (210) and (220). More specifically, the humidity adjusting side passageways (85), which are formed by the respective first members (210) and through which first air flows, are opened on two opposing side surfaces of the four side surfaces, and the cooling side passageways (86), which are formed by the respective second members (220) and through which first air flows, are opened on the remaining two opposing side surfaces.

Additionally, end surfaces of the rectangular parallelepiped-shaped adsorption element (81, 82), situated at both ends thereof relative to the lamination direction of the first and second members (210) and (220), each constitute a closed end surface (240) on which neither the humidity adjusting side passageways (85) nor the cooling side passageways (86) are opened. The closed end surface (240) is rectangle-shaped, having longer sides and shorter sides, wherein the length of the longer sides is $L_1$ and the length of the shorter sides is $L_2$. And, the humidity adjusting side passageways (85) are opened on the side surfaces of the adsorption element (81, 82) which are located on the longer-side side of the closed end surfaces (240) and the cooling side passageways (86) are opened on the side surfaces of the adsorption element (81, 82) which are located on the shorter-side side of the closed end surfaces (240).

Figure 15:
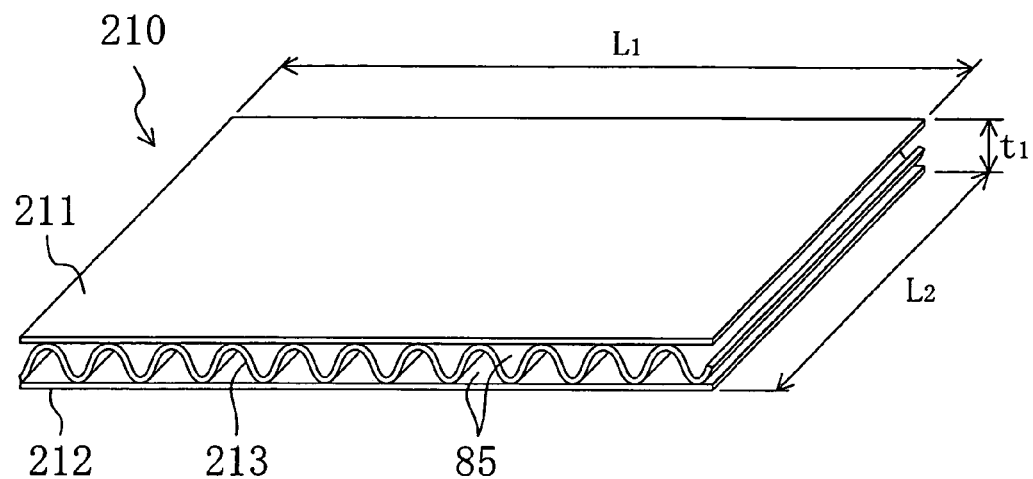
FIG. 15 is a schematic perspective view showing a first member of the adsorption element of the first modification example of the embodiment of FIG. 14.

As shown in FIG. 15, the first member (210) is rectangular plate-shaped and constitutes a partition member. More specifically, the length of the longer sides of the first member (210) is $L_1$, and the length of the shorter sides is $L_2$, and the thickness is ti. The first member (210) comprises two flat plates (211, 212) and a corrugated plate (213) sandwiched between the flat plates (211, 212). In the first member (210), the corrugated plate (213) is oriented such that its ridgeline direction extends parallel with the shorter sides of the flat plates (211, 212). And, in the first member (210), the humidity adjusting side passageway (85) is defined between the two flat plates (211, 212).

In the first member (210), the flat plates (211, 212) and the corrugated plate (213) are made of fiber paper such as ceramic paper, glass fiber paper et cetera. And, an adsorbent for the adsorption of water vapor is applied onto an internal surface of each flat plate (211, 212) as well as onto a surface of the corrugated plate (213). As the adsorbent, silica gel, zeolite, ion exchange resin, or the like may be employed.

Figure 16:
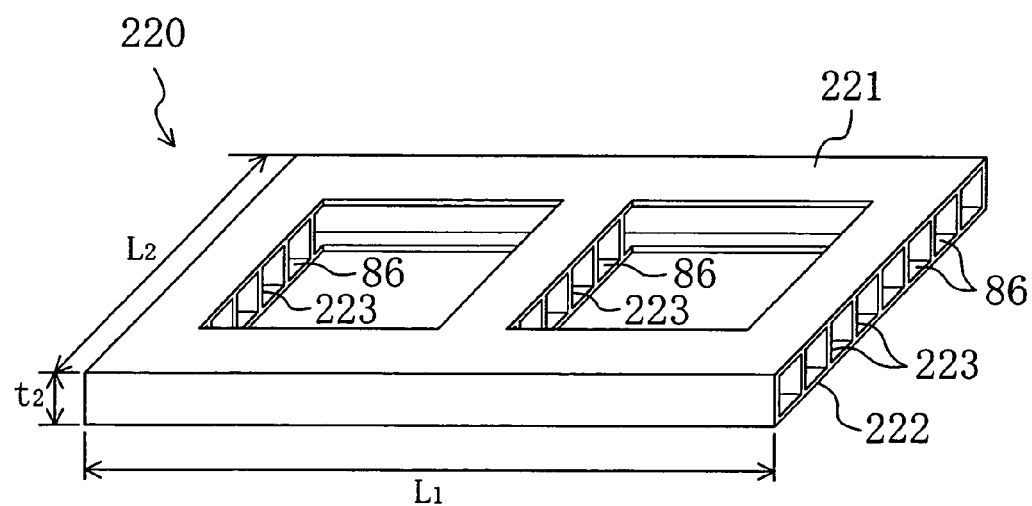
FIG. 16 is a schematic perspective view showing a second member of the adsorption element of the first modification example of the embodiment of FIG. 14.

As shown in FIG. 16, the second member (220) is rectangular frame-shaped. More specifically, the length of the longer sides of the second member (220) is $L_1$, the length of the shorter sides is $L_2$, and the thickness is $t_2$. The second member (220) is frame-shaped by punching out a central portion of a plastic cardboard shaped like a rectangular flat plate.

More specifically, the second member (220) comprises two flat plate parts (221, 222) disposed so as to be opposite to one another and a reinforcing bar part (223) interposed between the flat plate parts (221, 222). In order to maintain a clearance between the two flat plate parts (221, 222), the reinforcing bar part (223) is formed in a direction orthogonal to the flat plate parts (221, 222). Additionally, the direction, in which the reinforcing bar part (223) extends, extends parallel with the longer sides of the second member (220).

In the second member (220), the cooling side passageway (86) is defined between the flat plate parts (221, 222). Additionally, in the adsorption element (81, 82) in which the first members (210) and the second members (220) are alternately stacked one above the other, both sides of the punched-out portion of the second member (220) are blocked up by the first member (210), and such a portion also constitutes the cooling side passageway (86). In the second member (220), the surfaces of the flat plate parts (221, 222) and the reinforcing bar part (223) are not coated with adsorbent.

Second Modification Example

The adsorption element (81, 82) of the present invention may be constructed as follows.

As shown in FIGS. 17–20, the adsorption element (81, 82) of the present modification example comprises a plurality of element parts (251, 252, 253, 254). More specifically, the adsorption element (81, 82) is formed by combining the element parts (251–254) and is rectangular parallelepiped-shaped as a whole.

FIGS. 17–20 show adsorption elements resulting from applying the present modification example to the adsorption element (81, 82) of the first modification example. The adsorption element (81, 82) of the present modification example comprising either one of the foregoing combinations is identical in entire shape with the adsorption element (81, 82) of the first modification example (see FIG. 14).

In the adsorption element (81, 82) of the present modification example, each of the element parts (251, 252, 253, 254) is rectangular parallelepiped-shaped by an alternating lamination of first members (210) and second members (220). In the present modification example, the construction of the first members (210) and the construction of the second members (220) are the same as the first and second members (210) and (220) of the first modification example (see FIGS. 15 and 16). However, of the first and second members (210) and (220) of the present modification example, some of them have the same size as the first modification example and others are different in size from the first modification example.

In the rectangular parallelepiped-shaped element parts (251–254), humidity adjusting side passageways (85) and cooling side passageways (86) are opened on side surfaces of each rectangular parallelepiped-shaped element part (251–254) in parallel with the lamination direction of the first and second members (210) and (220). More specifically, the humidity adjusting side passageways (85), which are formed by the respective first members (210) and through which first air flows, are opened on two opposing side surfaces of the four side surfaces, and the cooling side passageways (86), which are formed by the respective second members (220) and through which first air flows, are opened on the remaining two opposing side surfaces. Additionally, neither the humidity adjusting side passageways (85) nor the cooling side passageways (86) are opened on end surfaces of each element part (251–254) orthogonal to the aforesaid four side surfaces.

Figure 17:
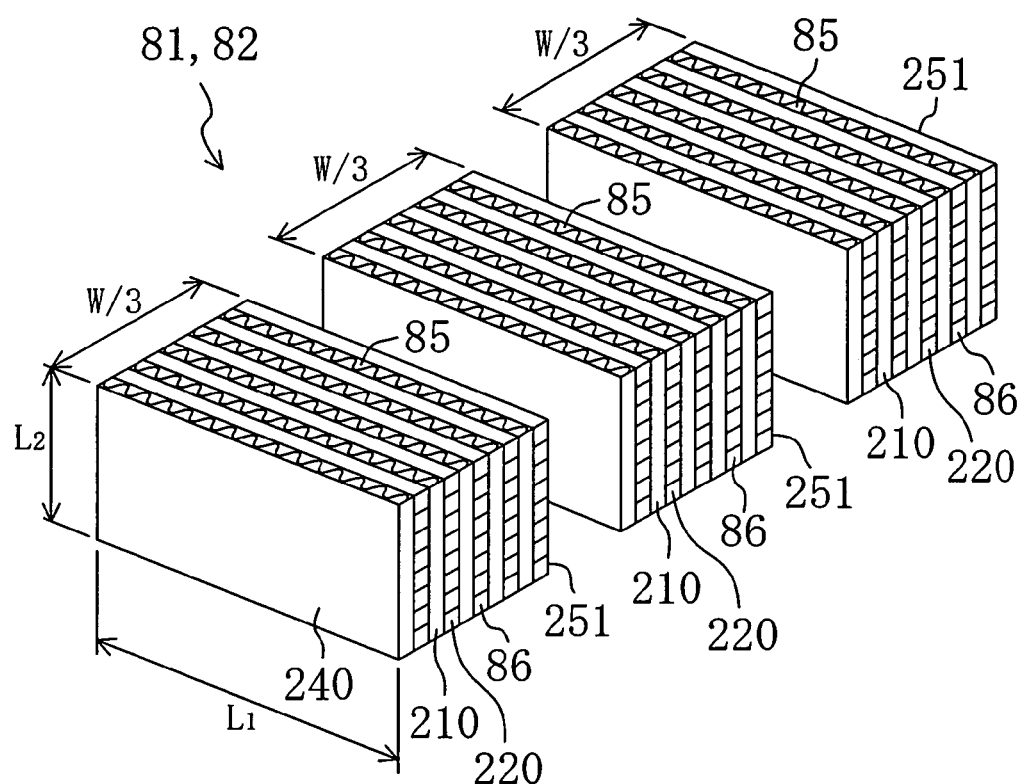
FIG. 17 is a schematic perspective view showing an adsorption element of a second modification example of the embodiment of FIG. 14.

Referring now to FIG. 17, there is shown an adsorption element (81, 82) made up of three element parts (251). First and second members (210) and (220) of the element part (251) are rectangle-shaped, like the first and second members (210) and (220) of the first modification example. In other words, the length of the longer sides of the first and second members (210) and (220) is $L_1$ and the length of the shorter sides is $L_2$. Additionally, the length of each element part (251) extending in the lamination direction of the first and second members (210) and (220) is W/3.

In the adsorption element (81, 82) of FIG. 17, the three elements parts (251) are arranged side by side in a line from front to rear in such orientation that end surfaces of adjoining element parts (251) face each other. The entire shape of the adsorption element (81, 82) is rectangular parallelepiped-shaped, and the lateral width of the adsorption element (81, 82) is $L_1$, the height is $L_2$, and the depth is W.

Furthermore, in the adsorption element (81, 82) of FIG. 17, a near-side end surface of the foremost element part (251) and a far-side end surface of the rearmost element part (251) each constitute a closed end surface (240) of the adsorption element (81, 82). Each closed end surface (240) is rectangle-shaped and the length of the longer sides is $L_1$ and the length of the shorter sides is $L_2$. In the adsorption element (81, 82), when viewed as a whole, the humidity adjusting side passageways (85) are opened on side surfaces of the adsorption element (81, 82) on the longer-side side of the closed end surfaces (240) and the cooling side passageways (86) are opened on side surfaces of the adsorption element (81, 82) on the shorter-side side of the closed end surfaces (240).

Figure 18:
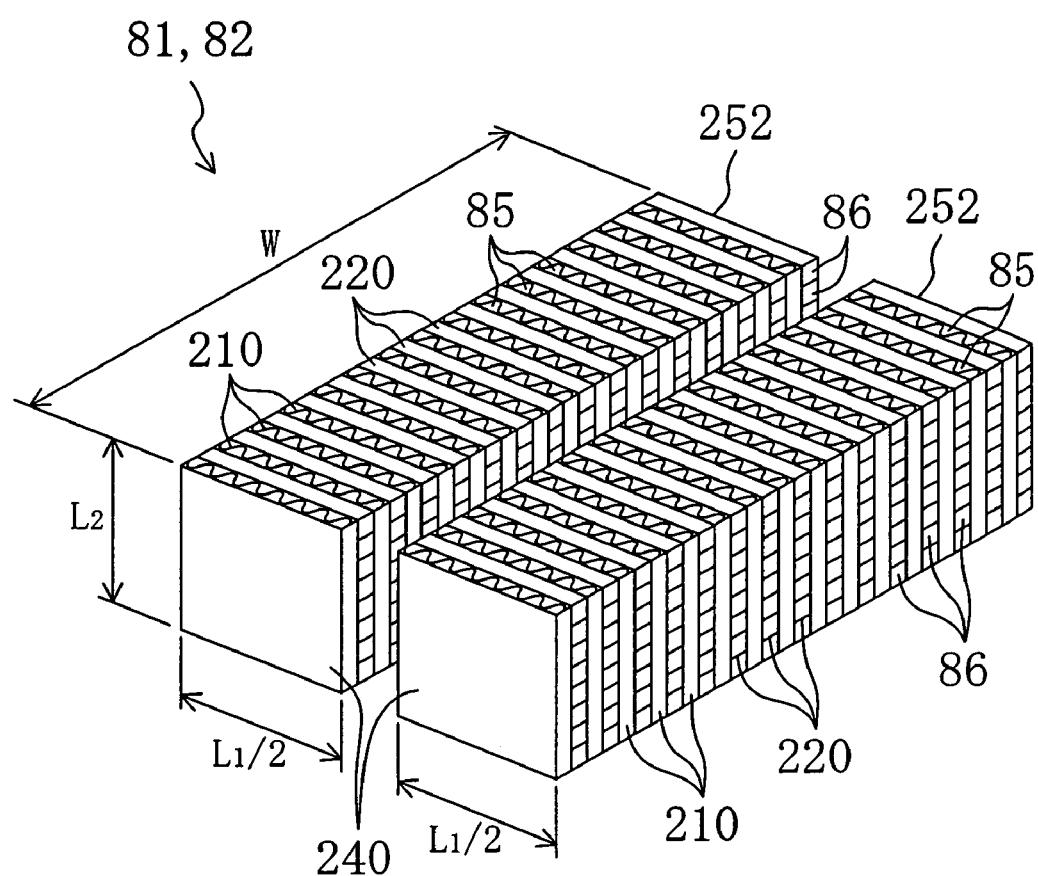
FIG. 18 is a schematic perspective view showing another adsorption element of the second modification example of the embodiment of FIG. 14.

Referring to FIG. 18, there is shown an adsorption element (81, 82) made up of two element parts (252). First and second members (210) and (220) of the element part (252) are square-shaped, as by dividing the first and second members (210) and (220) of the first modification example into two parts along the center of the longer sides thereof. In other words, the length of one side of each of the first and second members (210) and (220) is $L_1/2$ and the length of another side of each of the first and second members (210) and (220) orthogonal to the one side is $L_2$. Additionally, the length of each element part (252) extending in the lamination direction of the first and second members (210) and (220) is W.

In the adsorption element (81, 82) of FIG. 18, the two element parts (252) are laterally arranged side by side in such orientation that their side surfaces, on which the cooling side passageways (86) are opened, face each other. And, the entire shape of the adsorption element (81, 82) is rectangular parallelepiped-shaped, and the lateral width of the adsorption element (81, 82) is $L_1$, the height is $L_2$, and the depth is W.

Furthermore, in the adsorption element (81, 82) of FIG. 18, end surfaces of the two element parts (252), laterally arranged side by side, each constitute a closed end surface (240). Each closed end surface (240) of the adsorption element (81, 82) is rectangle-shaped by combining together two square-shaped end surfaces of the element parts (252). More specifically, the closed end surface (240) is rectangle-shaped, and the length of the longer sides is $L_1$ and the length of the shorter sides is $L_2$. In the adsorption element (81, 82), when viewed as a whole, the humidity adjusting side passageways (85) are opened on side surfaces of the adsorption element (81, 82) on the longer-side side of the closed end surfaces (240) and the cooling side passageways (86) are opened on side surfaces of the adsorption element (81, 82) on the shorter-side side of the closed end surfaces (240).

Figure 19:
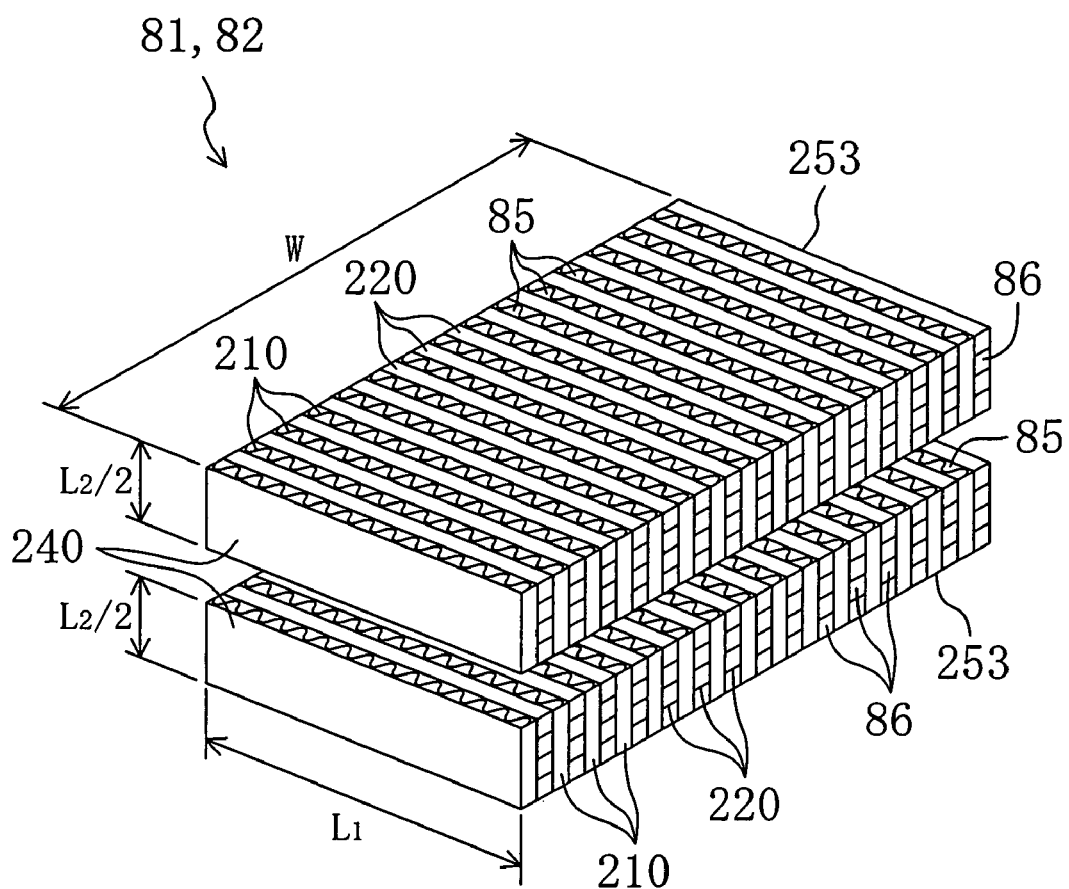
FIG. 19 is a schematic perspective view showing still another adsorption element of the second modification example of the embodiment of FIG. 14.

Referring to FIG. 19, there is shown an adsorption element (81, 82) made up of two element parts (253). First and second members (210) and (220) of the element part (253) are rectangle-shaped, as by dividing the first and second members (210) and (220) of the first modification example into two parts along the center of the shorter sides thereof In other words, the length of the longer sides of the first and second members (210) and (220) is $L_1$ and the length of the shorter sides is $L_2/2$. Additionally, the length of each element part (253) extending in the lamination direction of the first and second members (210) and (220) is W.

In the adsorption element (81, 82) of FIG. 19, the two element parts (253) are vertically stacked one upon the other in such orientation that their side surfaces, on which the humidity adjusting side passageways (85) are opened, face each other. And, the entire shape of the adsorption element (81, 82) is rectangular parallelepiped-shaped, and the lateral width of the adsorption element (81, 82) is $L_1$, the height is $L_2$, and the depth is W.

Furthermore, in the adsorption element (81, 82) of FIG. 19, end surfaces of the two element parts (252), vertically stacked one upon the other, each constitute a closed end surface (240). Each closed end surface (240) of the adsorption element (81, 82) is rectangle-shaped by combining together two square-shaped end surfaces of the element parts (253). More specifically, the closed end surface (240) is rectangle-shaped, and the length of the longer sides is $L_1$ and the length of the shorter sides is $L_2$. In the adsorption element (81, 82), when viewed as a whole, the humidity adjusting side passageways (85) are opened on side surfaces of the adsorption element (81, 82) on the longer-side side of the closed end surfaces (240) and the cooling side passageways (86) are opened on side surfaces of the adsorption element (81, 82) on the shorter-side side of the closed end surfaces (240).

Figure 20:
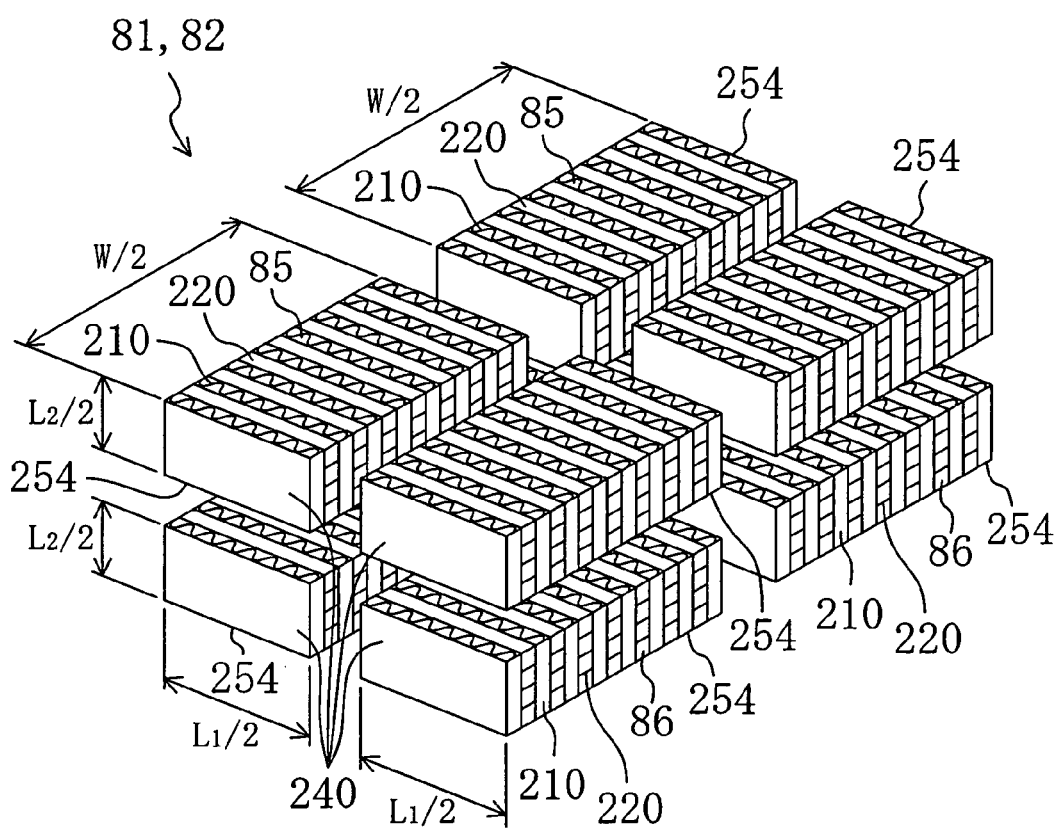
FIG. 20 is a schematic perspective view showing a further adsorption element of the second modification example of the embodiment of FIG. 14.

Referring to FIG. 20, there is shown an adsorption element (81, 82) made up of eight element parts (254). First and second members (210) and (220) of the element part (254) are rectangle-shaped, as by dividing the first and second members (210) and (220) of the first modification example into four parts along the centers of the longer and shorter sides thereof In other words, the length of the longer sides of the first and second members (210) and (220) is $L_1/2$ and the length of the shorter sides is $L_2/2$. Additionally, the length of each element part (254) extending in the lamination direction of the first and second members (210) and (220) is W/2.

In the adsorption element (81, 82) of FIG. 20, the eight element parts (254) are arranged in a predetermined orientation. More specifically, vertically adjoining element parts (254) are arranged in such orientation that their side surfaces, on which the humidity adjusting side passageways (85) are opened, face each other. On the other hand, laterally adjoining element parts (254) are arranged in such orientation that their side surfaces, on which the cooling side passageway (86) are opened, face each other. Additionally, longitudinally adjoining element parts (254) are arranged in such orientation that their end surfaces face each other. And, the entire shape of the adsorption element (81, 82) is rectangular parallelepiped-shaped and the lateral width is $L_1$, the height is $L_2$, and depth is W.

Furthermore, in the adsorption element (81, 82) of FIG. 20, end surfaces of four element parts (254), vertically and laterally arranged, together constitute a closed end surfaces (240). Each closed end surface (240) of the adsorption element (81, 82) is rectangle-shaped by combining together four square-shaped end surfaces of the element parts (254). More specifically, the closed end surface (240) is rectangle-shaped and the length of the longer sides is $L_1$ and the length of the shorter sides is $L_2$. In the adsorption element (81, 82), when viewed as a whole, the humidity adjusting side passageways (85) are opened on side surfaces of the adsorption element (81, 82) on the longer-side side of the closed end surfaces (240) and the cooling side passageways (86) are opened on side surfaces of the adsorption element (81, 82) on the shorter-side side of the closed end surfaces (240).

Additionally, in the adsorption element (81, 82) of the present modification example, the adsorption element-constituting element parts (251–254) are not necessarily joined together closely. Stated another way, some clearance may be left between the element parts (251–254) in the adsorption element (81, 82) of the present modification example.

Furthermore, in the adsorption element (81, 82), the element parts (251–254) are not necessarily firmly joined together. In other words, the element parts (251–254) may be elements parts capable of constituting a single adsorption element (81, 82) when housed in the casing (10) of the air conditioning apparatus.

Third Modification Example

In the air conditioning apparatus of each of the foregoing embodiments, second air is subjected to heat exchange with refrigerant in the regenerative heat exchanger (92), whereby the second air is heated by heat of condensation of the refrigerant. In stead of using such arrangement, the following arrangement may be employed.

In other words, second air is subjected to heat exchange with warm water in the regenerative heat exchanger (92), whereby the second air is heated by the warm water. In this case, the regeneration temperature in the air conditioning apparatus, i.e., the temperature of second air which is delivered from the regenerative heat exchanger (92) to the adsorption element (81, 82), can be from about 60 degrees Centigrade to about 80 degrees Centigrade. Accordingly, in the present modification example, it is advisable that the adsorption element (81, 82) is shaped so that $L_1/L_2$ is, for example, about 2.5.

Additionally, as the medium for heating the second air in the regenerative heat exchanger (92), for example, combustion gas or the like may be employed in addition to refrigerant and warm water. In this case, the regeneration temperature in the air conditioning apparatus can be about 100 degrees Centigrade.

In the air conditioning apparatus of each of the foregoing embodiments, the regeneration temperature is not always constant, in other words it will vary with the temperature of second air that is introduced into the regenerative heat exchanger (92). And, in the air conditioning apparatus, the lower limit of the range of variation in regeneration temperature is about 30 degrees Centigrade.

Stated another way, there is a limit to the performance of the regenerative heat exchanger (92) due to size restrictions or to other restrictions. Because of this, the difference between the temperature of the second air at the inlet of the regenerative heat exchanger (92) and the temperature of the second air at the outlet of the regenerative heat exchanger (92) is about 40 degrees Centigrade at the maximum. On the other hand, the temperature of outside air at the time of the operation of the air conditioning apparatus may be about −10 degrees Centigrade at the minimum. Therefore, when using outside air as the second air, the temperature of second air of −10 degrees Centigrade is increased by 40 degrees Centigrade, so that the regeneration temperature is 30 degrees Centigrade.

As described above, in the air conditioning apparatus of each of the foregoing embodiments, in the case where the second air is heated by heat of condensation of the refrigerant, the regeneration temperature varies in the range between not less than 30 degrees Centigrade and not more than 60 degrees Centigrade. Additionally, in the case where the second air is heated by combustion gas, the regeneration temperature varies in the range between not less than 30 degrees Centigrade and not more than 100 degrees Centigrade.

INDUSTRIAL APPLICABILITY

As has been described above, the present invention is useful for air conditioning apparatus capable of air humidity adjustment.

What is claimed is:

1. An adsorption element comprising first passageways where air flowing therethrough comes into contact with adsorbent and second passageways through which air flows for taking heat of adsorption produced in said first passageways,
   wherein:
   said adsorption element is rectangular parallelepiped-shaped by lamination of rectangular plate-shaped partition members at predetermined intervals,
   said first passageways and said second passageways are formed alternately in the lamination direction of said partition members, said first passageways are opened on side surfaces of said adsorption element which are located on the longer-side side of said partition members, and said second passageways are opened on side surfaces of said adsorption element which are located on the shorter-side side of said partition members.

2. The adsorption element of claim 1, wherein:

each said partition member having longer sides and shorter sides is formed such that the length of said longer sides is not more than four times the length of said shorter sides.

3. An adsorption element which comprises a plurality of element parts in each of which are formed first passageways where air flowing therethrough comes into contact with adsorbent and second passageways through which air flows for taking heat of adsorption produced in said first passageways, wherein said plural element parts are combined such that first air flows through each said first passageway and second air flows through each said second passageway, wherein:

said plural element parts are arranged so that said adsorption element is rectangular parallelepiped-shaped as a whole, and closed end surfaces of said adsorption element, on which neither said first passageways nor said second passageways are opened, are rectangle-shaped, and that said first passageways are opened on side surfaces of said adsorption element which are located on the longer-side side of said closed end surfaces and said second passageways are opened on side surfaces of said adsorption element which are located on the shorter-side side of said closed end surfaces.

4. The adsorption element of claim 3, wherein:

each said closed end surface of said adsorption element has longer sides and shorter sides, wherein the length of said longer sides is not more than four times the length of said shorter sides.

5. An air conditioning apparatus comprising a plurality of adsorption elements, said air conditioning apparatus alternately repeatedly carrying out a first operation in which air is dehumidified in said first adsorption element simultaneously with adsorbent regeneration in said second adsorption element and a second operation in which air is dehumidified in said second adsorption element simultaneously with adsorbent regeneration in said first adsorption element, for performing either an operating mode during which air taken in is dehumidified and then supplied indoors or an operating mode during which air taken in is humidified and then supplied indoors, wherein:

each said adsorption element comprises first passageways where air flowing therethrough comes into contact with adsorbent and second passageways through which air flows for taking heat of adsorption produced in said first passageways, each said adsorption element is rectangular parallelepiped-shaped by lamination of rectangular plate-shaped partition members at predetermined intervals, said first passageways and said second passageways are formed alternately in the lamination direction of said partition members, and said first passageways are opened on side surfaces of said adsorption element which are located on the longer-side side of said partition members, and said second passageways are opened on side surfaces of said adsorption element which are located on the shorter-side side of said partition members.

6. The air conditioning apparatus of claim 5, wherein:

each said partition member of said adsorption element, having longer sides and shorter sides, is formed such that the length of said longer sides is not more than four times the length of said shorter sides.

7. An air conditioning apparatus comprising a plurality of adsorption elements, said air conditioning apparatus alternately repeatedly carrying out a first operation in which air is dehumidified in said first adsorption element simultaneously with adsorbent regeneration in said second adsorption element and a second operation in which air is dehumidified in said second adsorption element simultaneously with adsorbent regeneration in said first adsorption element, for performing either an operating mode during which air taken in is dehumidified and then supplied indoors or an operating mode during which air taken in is humidified and then supplied indoors, wherein:

each said adsorption element comprises a plurality of element parts in each of which are formed first passageways where air flowing therethrough comes into contact with adsorbent and second passageways through which air flows for taking heat of adsorption produced in said first passageways, wherein said plural element parts are combined such that first air flows through each said first passageway and second air flows through each said second passageway, and said plural element parts are arranged so that said adsorption element is rectangular parallelepiped-shaped as a whole and closed end surfaces of said adsorption element, on which neither said first passageways nor said second passageways are opened, are rectangle-shaped, and that said first passageways are opened on side surfaces of said adsorption element which are located on the longer-side side of said closed end surfaces and said second passageways are opened on side surfaces of said adsorption element which are located on the shorter-side side of said closed end surfaces.

8. The air conditioning apparatus of claim 7, wherein:

each said closed end surface of said adsorption element has longer sides and shorter sides and the length of said longer sides is not more than four times the length of said shorter sides.

9. An air conditioning apparatus comprising an adsorption element and a heater for heating air which is supplied to said adsorption element for adsorbent regeneration, said air conditioning apparatus carrying out an operation in which an adsorbent of said adsorption element adsorbs water vapor contained in first air and an operation in which said adsorbent of said adsorption element is regenerated by second air heated by said heater, for the supplying of said dehumidified first air or said humidified second air into a room space, wherein:

said adsorption element comprises first passageways where air flowing therethrough comes into contact with adsorbent and second passageways through which air flows for taking heat of adsorption produced in said first passageways, said adsorption element is rectangular parallelepiped-shaped by lamination of rectangular plate-shaped partition members at predetermined intervals, said first passageways and said second passageways are formed alternately in the lamination direction of said partition members, and said first passageways are opened on side surfaces of said adsorption element which are located on the longer-side side of said partition members, and said second passageways are opened on side surfaces of said adsorption element which are located on the shorter-side side of said partition members.

10. The air conditioning apparatus of claim 9, wherein:

each said partition member of said adsorption element, having longer sides and shorter sides, is formed such that the length of said longer sides is not more than four times the length of said shorter sides.

11. An air conditioning apparatus comprising an adsorption element and a heater for heating air which is supplied to said adsorption element for adsorbent regeneration, said air conditioning apparatus carrying out an operation in which an adsorbent of said adsorption element adsorbs water vapor contained in first air and an operation in which said adsorbent of said adsorption element is regenerated by second air heated by said heater, for the supplying of said dehumidified first air or said humidified second air into a room space, wherein:

said adsorption element comprises a plurality of element parts in each of which are formed first passageways where air flowing therethrough comes into contact with adsorbent and second passageways through which air flows for taking heat of adsorption produced in said first passageways, wherein said plural element parts are combined such that first air flows through each said first passageway and second air flows through each said second passageway, and said plural element parts are arranged so that said adsorption element is rectangular parallelepiped-shaped as a whole and closed end surfaces of said adsorption element, on which neither said first passageways nor said second passageways are opened, are rectangle-shaped, and that said first passageways are opened on side surfaces of said adsorption element which are located on the longer-side side of said closed end surfaces and said second passageways are opened on side surfaces of said adsorption element which are located on the shorter-side side of said closed end surfaces.

12. The air conditioning apparatus of claim 11, wherein:

each said closed end surface of said adsorption element has longer sides and shorter sides and the length of said longer sides is not more than four times the length of said shorter sides.

13. The air conditioning apparatus of either claim 10 or claim 12, wherein:

the temperature of said second air which is supplied to said adsorption element for adsorbent regeneration is not more than 100 degrees Centigrade.

* * * * *